US008809462B2

(12) United States Patent
Nozue et al.

(10) Patent No.: US 8,809,462 B2
(45) Date of Patent: Aug. 19, 2014

(54) ETHYLENE-α-OLEFIN COPOLYMER, MOLDED ARTICLE, CATALYST FOR COPOLYMERIZATION, AND METHOD FOR PRODUCING AN ETHYLENE-α-OLEFIN COPOLYMER

(75) Inventors: Yoshinobu Nozue, Ichihara (JP); Naoko Ochi, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/321,677

(22) PCT Filed: May 27, 2010

(86) PCT No.: PCT/JP2010/059401
§ 371 (c)(1),
(2), (4) Date: Nov. 21, 2011

(87) PCT Pub. No.: WO2010/137734
PCT Pub. Date: Dec. 2, 2010

(65) Prior Publication Data
US 2012/0065346 A1    Mar. 15, 2012

(30) Foreign Application Priority Data
May 29, 2009  (JP) .................................. 2009-130154

(51) Int. Cl.
| | | |
|---|---|---|
| *C08L 23/08* | (2006.01) | |
| *C08F 4/653* | (2006.01) | |
| *C08F 4/6592* | (2006.01) | |
| *C08F 210/02* | (2006.01) | |
| *C08F 10/00* | (2006.01) | |
| *C08F 210/16* | (2006.01) | |
| *C08F 4/659* | (2006.01) | |

(52) U.S. Cl.
CPC ............. *C08L 23/0815* (2013.01); *C08F 10/00* (2013.01); *C08F 4/65916* (2013.01); *C08F 210/16* (2013.01); *C08F 4/65927* (2013.01); *C08F 2410/01* (2013.01); *C08F 4/65912* (2013.01); *Y10S 526/943* (2013.01)
USPC ........... 525/240; 526/113; 526/114; 526/160; 526/348.2; 526/943

(58) Field of Classification Search
CPC ............. C08L 23/0815; C08F 4/65904; C08F 4/65912; C08F 4/6592; C08F 210/02

USPC ........ 525/240; 526/113, 114, 160, 348.2, 943
See application file for complete search history.

(56) References Cited

U.S. PATENT DOCUMENTS

| | | | |
|---|---|---|---|
| 6,486,284 B1 | 11/2002 | Karande et al. | |
| 6,982,311 B2 | 1/2006 | Karande et al. | |
| 7,842,763 B2 * | 11/2010 | Jensen et al. .................. | 526/116 |
| 2003/0060579 A1 | 3/2003 | Oshima et al. | |
| 2005/0192417 A1 | 9/2005 | Iseki et al. | |
| 2008/0090983 A1 | 4/2008 | Satoh et al. | |
| 2010/0292421 A1 * | 11/2010 | Bando ............................ | 526/126 |
| 2010/0305292 A1 | 12/2010 | Nozue et al. | |
| 2010/0310799 A1 | 12/2010 | Nozue et al. | |
| 2011/0040059 A1 | 2/2011 | Nozue et al. | |

FOREIGN PATENT DOCUMENTS

| | | |
|---|---|---|
| CN | 1267315 A | 9/2000 |
| EP | 0 770 629 A2 | 5/1997 |
| JP | 9-165406 A | 6/1997 |
| JP | 2001-515114 A | 9/2001 |
| JP | 2003-096125 A | 4/2003 |
| JP | 2004-149761 A | 5/2004 |
| JP | 2006-233206 A | 9/2006 |
| JP | 2009-40894 A | 2/2009 |
| WO | 2009/066689 A1 | 5/2009 |
| WO | 2009/069823 A1 | 6/2009 |

OTHER PUBLICATIONS

Office Action issued Oct. 8, 2012 in Chinese Patent Application No. 201080033566.4 to Sumitomo Chemical Co., Ltd. with translation.
State Intellectual Property Office, P.R. China, "Second Office Action," issued in connection with Chinese Patent Application No. 201080033566.4, dated Jul. 3, 2013.
Notice of Reasons for Rejection dated Nov. 5, 2013, issued in Japanese Patent Application No. 2010-122507.

* cited by examiner

*Primary Examiner* — Caixia Lu
(74) *Attorney, Agent, or Firm* — Sughrue Mion, PLLC

(57) ABSTRACT

An ethylene-α-olefin copolymer comprising monomer units derived from ethylene and monomer units derived from an α-olefin having 3 to 20 carbon atoms, having a density (d) of 860 to 950 kg/m$^3$, having a melt flow rate (MFR) of 0.01 to 100 g/10 min, having a bimodal molecular weight distribution, and having a single melting peak measured by a differential scanning calorimeter (DSC).

3 Claims, No Drawings

ETHYLENE-α-OLEFIN COPOLYMER, MOLDED ARTICLE, CATALYST FOR COPOLYMERIZATION, AND METHOD FOR PRODUCING AN ETHYLENE-α-OLEFIN COPOLYMER

CROSS REFERENCE TO RELATED APPLICATIONS

This application is a National Stage of International Application No. PCT/JP2010/059401 filed May 27, 2010, claiming priority based on Japanese Patent Application No. 2009-130154 filed May 29, 2009, the contents of all of which are incorporated herein by reference in their entirety.

TECHNICAL FIELD

The present invention relates to an ethylene-α-olefin copolymer and an article obtained by extruding the ethylene-α-olefin copolymer. Also, the present invention is a catalyst for copolymerizing ethylene with an α-olefin, and a method for producing an ethylene-α-olefin copolymer using the catalyst.

BACKGROUND ART

Ethylene-α-olefin copolymers are molded into films, sheets, bottles, etc., by a variety of molding methods and are subjected to a variety of utilities such as food packaging materials.

Among the ethylene-α-olefin copolymers, a copolymer polymerized using a metallocene catalyst is known to be superior in a mechanical strength such as an impact strength and a tensile strength. For this reason, when such a copolymer is used, since its thickness can be reduced while a mechanical strength possessed by an article formed from an ethylene-α-olefin copolymer polymerized using a catalyst which is not the metallocene catalyst is maintained, weight saving and cost saving of articles can be expected. Therefore, utilization of the copolymer in a variety of utilities is studied. However, the ethylene-α-olefin copolymer polymerized using the previous metallocene catalyst is of a high extrusion load at extruding, and improvement has been requested.

To the contrary, nowadays, a novel metallocene catalyst has been studied, and an ethylene-α-olefin copolymer with improved molding processability, polymerized by the catalyst has been proposed. For example, Patent Literature 1 describes an ethylene-α-olefin copolymer polymerized using a metallocene copolymer comprising a transition metal compound having a ligand in which two groups having a cyclopentadiene-type anion framework are bound via a bridging group, a transition metal compound having two groups having a substituted cyclopentadiene-type anion framework which are not bound to each other, and a co-catalyst component for activation. In addition, Patent Literature 2 describes an ethylene-α-olefin copolymer polymerized using a metallocene catalyst comprising a co-catalyst component obtained by bringing silica, hexamethyldisilazane, diethylzinc, pentafluorophenol, and water into contact with each other, triisobutylaluminum, and racemic-ethylenebis(1-indenyl)zirconium diphenoxide. In addition, Patent Literature 3 describes an ethylene-α-olefin copolymer polymerized using a metallocene catalyst comprising a combination of a transition metal compound having a ligand in which two groups having a cyclopentadiene-type anion framework are bound via a bridging group, and a transition metal compound having a ligand in which a group having a cyclopentadiene-type anion framework and a group having a fluorenyl-type anion framework are bound via a bridging group, and a carrier obtained by treatment for carrying methylaluminoxane as a co-catalyst on a porous silica.

[Patent Literature 1] JP-A No. 2003-96125 gazette
[Patent Literature 2] JP-A No. 2004-149761 gazette
[Patent Literature 3] JP-A No. 2006-233206 gazette However, although in the ethylene-α-olefin copolymers described in Patent Literatures 1 and 2, an extrusion load at molding processing is reduced as compared with the ethylene-α-olefin copolymers polymerized using the previous metallocene catalyst, further reduction in an extrusion load is requested, and the ethylene-α-olefin copolymer described in Patent Literature 3 was not sufficiently satisfactory in take-up property yet at molding.

DISCLOSURE OF THE INVENTION

Under such circumstances, a problem to be solved by the invention is to provide an ethylene-α-olefin copolymer which has a low extrusion load, and is superior in take-up property when a melted copolymer is taken up under the constant tensile force condition, and an article obtained by extruding the copolymer. In addition, a problem to be solved by the invention is to provide a catalyst for copolymerization suitable for production of an ethylene-α-olefin copolymer which has a low extrusion load, and is superior in take-up property when a melted copolymer is taken up under the constant tensile force condition, and a method for producing an ethylene-α-olefin copolymer using the catalyst.

A first invention of the present invention relates to an ethylene-α-olefin copolymer comprising monomer units derived from ethylene and monomer units derived from an α-olefin having 3 to 20 carbon atoms, having a density (d) of 860 to 950 kg/m$^3$, having a melt flow rate (MFR) of 0.01 to 100 g/10 min, having a bimodal molecular weight distribution, and having a single melting peak measured by a differential scanning calorimeter (DSC).

A second invention of the present invention relates to an ethylene-α-olefin copolymer comprising monomer units derived from ethylene and monomer units derived from an α-olefin having 3 to 20 carbon atoms, having a density (d) of 860 to 950 kg/m$^3$, having a melt flow rate (MFR) of 0.01 to 100 g/10 min, and having a bimodal molecular weight distribution, wherein the elongational viscosity nonlinear index ratio (k1/k2) thereof and the MFR satisfy the following relation:

$$0.084 \times \ln(MFR) + 0.69 < k1/k2 < 0.126 \times \ln(MFR) + 1.03.$$

A third invention of the present invention relates to an obtained by extruding the ethylene-α-olefin copolymer.

A fourth invention of the present invention is a catalyst for copolymerizing ethylene with an α-olefin, wherein the catalyst is formed by bringing the following component (A1), the following component (A2), the following component (B), and the following component (C) into contact with each other, and wherein the molar ratio ((A1)/(A2)) of the component (A1) to the component (A2) is from 1 to 90:

component (A1): a transition metal compound represented by the following general formula (1),

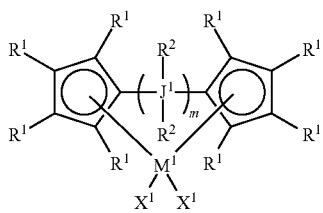

(1)

wherein $M^1$ represents a transition metal atom of Group 4 in the periodic table of the elements; $J^1$ represents an atom of Group 14 in the periodic table of the elements; m represents an integer of 1 to 5; $X^1$, $R^1$, and $R^2$ are the same or different, and each independently represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms; the $X^1$ groups may be the same or different; the $R^1$ groups may be the same or different; and the $R^2$ groups may be the same or different, component (A2): a transition metal compound represented by the following general formula (2),

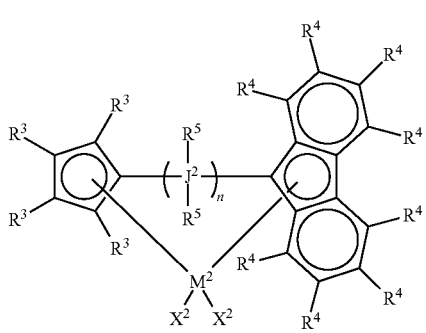

(2)

wherein $M^2$ represents a transition metal atom of Group 4 in the periodic table of the elements; $J^2$ represents an atom of Group 14 in the periodic table of the elements; n represents an integer of 1 to 5; $X^2$, $R^3$, $R^4$, and $R^5$ are the same or different, and each independently represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms; the $X^2$ groups may be the same or different; the $R^3$ groups may be the same or different; the $R^4$ groups may be the same or different; and the $R^5$ groups may be the same or different;

component (B): a catalyst component formed by bringing the following component (b1), the following component (b2), and the following component (b3) into contact with each other, (b1): a compound represented by the following general formula (3), $$M^3 L_x \quad (3)$$

wherein $M^3$ represents a lithium atom, a sodium atom, a potassium atom, a rubidium atom, a cesium atom, a beryllium atom, a magnesium atom, a calcium atom, a strontium atom, a barium atom, a zinc atom, a germanium atom, a tin atom, a lead atom, an antimony atom, or a bismuth atom; x represents a number corresponding to the valence of $M^3$; L represents a hydrogen atom, a halogen atom, or an optionally substituted hydrocarbyl group having 1 to 20 carbon atoms; and when there are two or more L, they may be the same or different, (b2): a compound represented by the following general formula (4), $$R^6_{t-1} T^1 H \quad (4)$$

wherein $T^1$ represents an oxygen atom, a sulfur atom, a nitrogen atom, or a phosphorus atom; t represents a number corresponding to the valence of $T^1$; $R^6$ represents a halogen atom, an electron-withdrawing group, a halogen atom-containing group, or a group containing an electron-withdrawing group; and when there are two or more $R^6$, they may be the same or different, (b3): a compound represented by the following general formula (5), $$R^7_{s-2} T^2 H_2 \quad (5)$$

wherein $T^2$ represents an oxygen atom, a sulfur atom, a nitrogen atom, or a phosphorus atom; s represents a number corresponding to the valence of $T^2$; $R^7$ represents a halogen atom, a hydrocarbyl group having 1 to 20 carbon atoms, or a halogenated hydrocarbyl group having 1 to 20 carbon atoms, component (C): an organoaluminum compound.

A fifth invention of the present invention is a catalyst for copolymerizing ethylene with an α-olefin according to the third invention, wherein the component (B) is a solid catalyst component formed by bringing the above component (b1), the above component (b2), the above component (b3), and the following component (b4) into contact with each other;

(b4): a granular carrier.

A sixth invention of the present invention is a method for producing an ethylene-α-olefin copolymer, comprising copolymerizing ethylene with an α-olefin in the presence of the above catalyst for copolymerization.

MODE FOR CARRYING OUT THE INVENTION

A first invention of the present invention is an ethylene-α-olefin copolymer comprising monomer units derived from ethylene and monomer units derived from an α-olefin having 3 to 20 carbon atoms, having a density (d) of 860 to 950 kg/m³, having a melt flow rate (MFR) of 0.01 to 100 g/10 min, having a bimodal molecular weight distribution, and having a single melting peak measured by a differential scanning calorimeter (DSC).

A second invention of the present invention is an ethylene-α-olefin copolymer comprising monomer units derived from ethylene and monomer units derived from an α-olefin having 3 to 20 carbon atoms, having a density (d) of 860 to 950 kg/m³, having a melt flow rate (MFR) of 0.01 to 100 g/10 min, and having a bimodal molecular weight distribution, wherein the elongational viscosity nonlinear index ratio (k1/k2) thereof and the MFR satisfy the following relation:

0.084×ln(MFR)+0.69<k1/k2<0.126×ln(MFR)+1.03.

Hereinafter, when two kinds of the ethylene-α-olefin copolymers are described by discriminating them, the ethylene-α-olefin copolymer which is described earlier is described as a first ethylene-α-olefin copolymer, and the ethylene-α-olefin copolymer which is described later is described as a second ethylene-α-olefin copolymer. When it is not necessary to discriminate them, they are described as an ethylene-α-olefin copolymer.

The ethylene-α-olefin copolymer of the present invention is an ethylene-α-olefin copolymer comprising monomer units derived from ethylene and monomer units derived from an α-olefin having 3 to 20 carbon atoms. Examples of the α-olefin include propylene, 1-butene, 1-pentene, 1-hexene, 1-heptene, 1-octene, 1-nonene, 1-decene, 1-dodecene, 4-methyl-1-pentene, 4-methyl-1-hexene, etc., and these may be used alone, or two or more kinds thereof may be used together. The α-olefin is preferably 1-butene, 1-hexene, 4-methyl-1-pentene, or 1-octene.

The ethylene-α-olefin copolymer of the present invention may comprise monomer units derived from other monomer in such a range that the effect of the present invention does not deteriorate, in addition to the monomer units derived from ethylene and the monomer units derived from an α-olefin having 3 to 20 carbon atoms. Examples of other monomer include a conjugated diene (e.g. butadiene and isoprene), a non-conjugated diene (e.g. 1,4-pentadiene), acrylic acid, acrylic acid ester (e.g. methyl acrylate and ethyl acrylate), methacrylic acid, methacrylic acid ester (e.g. methyl methacrylate and ethyl methacrylate), vinyl acetate, etc.

A content of monomer units derived from ethylene in the ethylene-α-olefin copolymer of the present invention is usually 50 to 99.5% by weight relative to a total weight (100% by weight) of the ethylene-α-olefin copolymer. A content of monomer units derived from an α-olefin is usually 0.5 to 50% by weight relative to a total amount (100% by weight) of the ethylene-α-olefin copolymer.

The ethylene-α-olefin copolymer of the present invention is preferably a copolymer comprising monomer units derived from ethylene and monomer units derived from an α-olefin having 4 to 20 carbon atoms, more preferably a copolymer comprising monomer units derived from ethylene and monomer units derived from an α-olefin having 5 to 20 carbon atoms, further preferably a copolymer comprising monomer units derived from ethylene and monomer units derived from an α-olefin having 6 to 8 carbon atoms.

Examples of the ethylene-α-olefin copolymer of the present invention include an ethylene-1-butene copolymer, an ethylene-1-hexene copolymer, an ethylene-4-methyl-1-pentene copolymer, an ethylene-1-octene copolymer, an ethylene-1-butene-1-hexene copolymer, an ethylene-1-butene-4-methyl-1-pentene copolymer, an ethylene-1-butene-1-octene copolymer, an ethylene-1-hexene-1-octene copolymer, etc. The ethylene-α-olefin copolymer is preferably an ethylene-1-hexene copolymer, an ethylene-4-methyl-1-pentene copolymer, an ethylene-1-butene-1-hexene copolymer, an ethylene-1-butene-1-octene copolymer, or an ethylene-1-hexene-1-octene copolymer.

A density (hereinafter, described as "d" in some cases) of the ethylene-α-olefin copolymer of the present invention is 860 to 950 kg/m$^3$. From a view point of enhancement in a mechanical strength of the resulting article, the density is preferably 940 kg/m$^3$ or less, more preferably 935 kg/m$^3$ or less. Further, from a view point of enhancement in rigidity of the resulting article, the density is preferably 870 kg/m$^3$ or more, more preferably 880 kg/m$^3$ or more, further preferably 890 kg/m$^3$ or more, particularly preferably 900 kg/m$^3$ or more. The density is measured according to the method described in the A method of JIS K7112-1980, after annealing described in JIS K6760-1995. The density of ethylene-α-olefin copolymer can be changed by a content of monomer units derived from ethylene in the ethylene-α-olefin copolymer.

A melt flow rate (hereinafter, described as "MFR" in some cases) of the ethylene-α-olefin copolymer of the present invention is usually 0.01 to 100 g/10 min. The melt flow rate is preferably 0.1 g/10 min or more from a view point of reduction in an extrusion load at molding processing. Further, from a view point of enhancement in a mechanical strength of the resulting article, the melt flow rate is preferably 50 g/10 min or less, more preferably 30 g/10 min or less, further preferably 15 g/10 min or less. The melt flow rate is a value measured by the A method, under the condition of a temperature of 190° C. and a load of 21.18 N, in the method defined in JIS K7210-1995. The melt flow rate of the ethylene-α-olefin copolymer can be changed, for example, by a hydrogen concentration or a polymerization temperature in the production method described later, and as a hydrogen concentration or a polymerization temperature is raised, the melt flow rate of the ethylene-α-olefin is increased.

The ethylene-α-olefin copolymer of the present invention exhibits a bimodal molecular weight distribution. Herein, the bimodal distribution means that a molecular weight distribution curve measured by gel•permeation•chromatograph (GPC) method has two peaks. When a molecular weight distribution is a monomodal distribution, an extrusion load becomes high. In order to reduce an extrusion load, as a shape of a bimodal molecular weight distribution, it is preferable that a peak position on a lower molecular weight side be 35,000 or less as expressed by Mw, and a peak position on a higher molecular weight side be 150,000 or more. From a view point of enhancement in a mechanical strength of an article obtained using the copolymer, the peak position on a lower molecular weight side is preferably 5,000 or more, more preferably 7,000 or more as expressed by Mw. The ratio of the heights of two peaks of a molecular weight distribution curve measured by the GPC method is preferably 0.1<H/L<0.45, and 0.1<H/L<0.35, where the height of the peak on a lower molecular weight side is L and the height of the peak on a higher molecular weight side is H. When H/L is too small, a mechanical strength of an article obtained using the ethylene-α-olefin copolymer is reduced. When H/L is too large, there is a tendency that transfer becomes difficult, when a shape of a mold or a roll surface is transferred to form embossing, etc., on a surface of an article obtained using an ethylene-α-olefin copolymer.

The first ethylene-α-olefin copolymer of the present invention is a copolymer in which, in a melting curve obtained from differential scanning calorimetry of the ethylene-α-olefin copolymer, a melting peak present in a range of from 25° C. to a melting completion temperature is single. The presence of a plurality of melting peaks indicates a melting peak different from a maximum melting peak (a melting peak having a largest peak height) is present, and means that a compositional distribution of the ethylene-α-olefin copolymer (distribution of a ratio of contained monomer units between respective polymer components contained in the ethylene-α-olefin copolymer) is broad. That is, the melting peak being single means that a compositional distribution of the ethylene-α-olefin copolymer is narrow. When the number of melting peaks is large, there is a tendency that take-up property of a melted resin deteriorates.

A melting curve of the ethylene-α-olefin copolymer is a differential scanning calorimetry curve obtained, for example, by measurement of (4), by (1) retaining an aluminum pan, in which about 10 mg of a sample is sealed, at 150° C. for 5 minutes, (2) reducing a temperature of the sample from 150° C. to 20° C. at 5° C./min, (3) retaining the sample at 20° C. for 2 minutes, and (4) raising a temperature of the sample from 20° C. to a melting completion temperature+about 20° C. (usually, around 150° C.), with a differential scanning calorimeter (e.g. differential scanning calorimeter Model DSC 7 manufactured by Perkin Elmer).

A ratio (hereinafter, described as "Mw/Mn" in some cases) of a weight average molecular weight (hereinafter, described as "Mw" in some cases) to a number average molecular weight (hereinafter, described as "Mn" in some cases) of the ethylene-α-olefin copolymer of the present invention is preferably 4 to 30, and a ratio (hereinafter, described as "Mz/Mw" in some cases) of a Z average molecular weight (hereinafter, described as "Mz" in some cases) to a weight average molecular weight (Mw) is preferably 5 to 15. When Mw/Mn is too small, an extrusion load at molding processing becomes high in some cases. Mw/Mn is more preferably 4.5 or more, further preferably 5.5 or more, particularly preferably 6 or more. When Mz/Mw is too small, there is a tendency that transfer becomes difficult, when a shape of a mold or a roll surface is transferred to form embossing, etc., on a surface of an article obtained using an ethylene-α-olefin copolymer. Mz/Mw is preferably 6 or more, more preferably 6.5 or more. When Mw/Mn or Mz/Mw is too large, a mechanical strength of the resulting article becomes low in some cases. Mw/Mn is preferably 25 or less, more preferably 20 or less, further preferably 17 or less, particularly preferably 15 or less. Mz/Mw is preferably 15 or less, further preferably 13 or less. The Mw/Mn and the Mz/Mw are obtained by measuring a number average molecular weight (Mn), a weight average molecular weight (Mw) and a Z average molecular weight (Mz) by the GPC method, and dividing Mw by Mn, and dividing Mz by Mw. The Mw/Mn can be changed, for example, by a hydrogen concentration in the production method described later, and when a hydrogen concentration is increased, Mw/Mn of the ethylene-α-olefin copolymer becomes small. The Mz/Mw can be changed, for examples, by a use ratio of a transition metal compound (A1) to a transition metal compound (A2) in the production method described later.

A swell ratio (hereinafter, described as "SR" in some cases) of the ethylene-α-olefin copolymer of the present invention is preferably 1.6 or more. When the swell ratio is too small, neck-in becomes large at flat die process in some cases. From a view point of enhancement in take-up property at extruding, the swell ratio is preferably 3.0 or less, more preferably 2.8 or less. The swell ratio is a value (D/D$_0$) obtained by cooling in air a strand of the ethylene-α-olefin copolymer extruded at a length of around 15 to 20 mm from an orifice under the condition of a temperature of 190° C. and a load of 21.18 N, upon measurement of a melt flow rate (MFR), measuring a diameter D (unit: mm) of the strand at a position of about 5 mm from a tip on an extrusion upstream side, and dividing the diameter D by an orifice diameter 2.095 mm (D$_0$). The swell ratio can be changed, for example, by a hydrogen concentration, an ethylene pressure, or an electron donating compound concentration at polymerization, in the production method described later, and when a hydrogen concentration is increased, or an ethylene pressure is reduced, the swell ratio of the ethylene-α-olefin copolymer becomes large. The swell ratio can be controlled by implementing prepolymerization at polymerization, etc.

A number of branches having 5 or more carbon atoms of the ethylene-α-olefin copolymer of the present invention (hereinafter, described as "N$_{LCB}$" in some times), from a view point of more reduction in an extrusion load at molding processing, is preferably 0.1/1000 C or more, more preferably 0.12/1000 C or more. From a view point of enhancement in a mechanical strength of the resulting article, N$_{LCB}$ is preferably 1/1000 C or less, more preferably 0.7/1000 C or less. The N$_{LCB}$ can be changed, for example, by a concentration of an electron donating compound or a use ratio of a transition metal compound (A1) to a transition metal compound (A2) in the production method described later. Alternatively, the N$_{LCB}$ can be also controlled by implementing prepolymerization.

N$_{LCB}$ is obtained by determining the area of peaks derived from methine carbon to which a branch having 5 or more carbon atoms is attached, from a $^{13}$C-NMR spectrum measured by a carbon nuclear magnetic resonance ($^{13}$C-NMR) method, taking the sum of the areas of all peaks observed at 5 to 50 ppm as 1000. A peak derived from methine carbon to which a branch having 5 or more carbon atoms is attached is observed at around 38.2 ppm (cf. academic document "Macromolecules", (USA), American Chemical Society, 1999, vol. 32, p. 3817-3819). Since a position of this peak derived from methine carbon to which a branch having 5 or more carbon atoms is attached, is shifted depending on a measurement apparatus and measurement condition in some cases, usually, the position is determined by performing measurement of an authentic sample for every measurement apparatus and measurement condition. For spectral analysis, it is preferable to use a negative exponential function as a window function.

A characteristic relaxation time (hereinafter, described as "τ" in some cases) of the ethylene-α-olefin copolymer of the present invention is preferably 5 seconds or longer, more preferably 10 seconds or longer, further preferably 20 seconds or longer, in order that transfer becomes easy when a shape of a mold or a roll surface is transferred to form embossing, etc., on a surface of an article obtained using the ethylene-α-olefin copolymer. The characteristic relaxation time is a numerical value indicating a length of a long chain branch possessed by the ethylene-α-olefin copolymer, and when the long chain branch is short, the characteristic relaxation time becomes a small value, and when the long chain branch is long, the characteristic relaxation time becomes a large value. The characteristic relaxation time can be changed, for example, by polymerization conditions such as a hydrogen concentration and an ethylene pressure, or a use ratio of a transition metal compound (A1) to a transition metal compound (A2), and when a use ratio of the transition metal compound (A2) is reduced in a range of the transition metal compound (A1): the transition metal compound (A2) of from 60:1 to 12.5:1, the characteristic relaxation time of the ethylene-α-olefin copolymer can be lengthened.

The characteristic relaxation time is a numerical value calculated from a master curve exhibiting angular frequency (unit: rad/sec) dependency of a melt complex viscosity (unit: Pa·sec) at 190° C., which is produced based on a temperature-time superposition principle. Specifically, this is a value calculated by superposing a melt complex viscosity-angular frequency curve (unit of melt complex viscosity is Pa·sec, unit of angular frequency is rad/sec) of the ethylene-α-olefin copolymer at each temperature (T, unit: ° C.) of 130° C., 150° C., 170° C., and 190° C. on a melt complex viscosity-angular frequency curve at 190° C. based on a temperature-time superposition principle to produce a master curve, and approximating the resulting master curve by the following equation (I):

$$\eta = \eta_0 / [1 + (\tau \times \omega)^n] \quad (I)$$

η: melt complex viscosity (unit: Pa·sec)
ω: angular frequency (unit: rad/sec)
τ: characteristic relaxation time (unit: sec)
η$_0$: constant obtained for every ethylene-α-olefin copolymer (unit: Pa·sec)
n: constant obtained for every ethylene-α-olefin copolymer.

The calculation may use a commercially available calculation software, and examples of the calculation software include Rhios V.4.4.4 manufactured by Rheometrics.

Measurement of the melt complex viscosity-angular frequency curve is performed using a viscoelasticity measuring apparatus (e.g. Rheometrics Mechanical Spectrometer RMS-800 manufactured by Rheometrics), usually, under the conditions of geometry: parallel plates, a plate diameter: 25 mm, a plate interval: 1.5 to 2 mm, a strain: 5%, and an angular frequency: 0.1 to 100 rad/sec. The measurement is performed under the nitrogen atmosphere, and it is preferable to blend a suitable amount (e.g. 1000 ppm) of an antioxidant into a measurement sample in advance.

A melt tension (hereinafter, described as "MT" in some cases) of the ethylene-α-olefin copolymer of the present invention satisfies the relation (1) for MFR.

$$8.72 \times MFR^{-0.56} < MT < 56.28 \times MFR^{-0.62} \qquad (1)$$

It is reported in the reference (D. Ancierno et al., Journal of Rheology, 29(3), 323-334 (1985)) that a value of MT when a winding rate is increased at MT measurement, and breakage occurs, can be expressed by the following empirical equation (2) for MFR:

$$MT \cdot \alpha \exp(\beta Mw) \qquad (2).$$

It is also reported in the reference (Mortimer et al., Journal of Applied Polymer Science, 8, 839-847 (1964), etc.) that the relation between Mw and MFR can be empirically expressed by the equation (3):

$$Mn = A + B\log(MFR) \qquad (3),$$

and it is seen that when these equations are combined, MT can be empirically expressed as:

$$MT = C \cdot MFR^D (C \text{ and } D \text{ are constant}) \qquad (4)$$

using MFR. C and D vary depending on the following ratio of transition metal compounds, etc., but when the polymerization conditions other than a hydrogen concentration is approximately the same, values of C and D can be regarded almost constant. Then, from data contained in Examples, a plotting between MT and MFR of Example in which transition metal compound (A1): transition metal compound (A2) was 60:1, and the polymerization conditions other than a hydrogen concentration were adjusted at almost constant was fitted by the (4) equation using Microsoft Excel, and 30% of a value of C obtained at fitting was added to a coefficient part of C or D as a result of fitting to obtain a right side. A significant figure was two places of decimals. Similarly, a plotting between MT and MFR of Example in which transition metal compound (A1):transition metal compound (A2) was 12.5:1, and the polymerization conditions other than a hydrogen concentration were adjusted at almost constant was fitted similarly by the (4) equation, and 30% of an absolute value of C or D obtained upon fitting was subtracted from a coefficient part of C or D as a result of fitting to obtain a left side.

When the melt tension is too small, stability of bubbles is reduced at blown film process, or shape retainability of a parison is reduced at hollow molding in some cases. The melt tension satisfies preferably the relation (1)' between MFR and MT, further preferably the relation (1)" between MFR and MT. The relations (1)', (1)", and (1)''' were derived by entirely similarly except that a part of adding or subtracting 30% of a value of C, upon derivation of a right side and a left side of the relation (1) was changed to addition or subtraction of each of 20%, 10%, and 0%.

$$9.97 \times MFR^{-0.56} < MT < 51.95 \times MFR^{-0.62} \qquad (1)'$$

$$11.21 \times MFR^{-0.56} < MT < 47.62 \times MFR^{-0.62} \qquad (1)''$$

$$12.46 \times MFR^{-0.56} < MT < 43.29 \times MFR^{-0.62} \qquad (1)'''$$

The melt tension is a maximum tensile force from take-up initiation to breakage of a filamentous ethylene-α-olefin copolymer, in a tensile force when a melted ethylene-α-olefin copolymer is extruded from an orifice having a diameter of 2.095 mm and a length of 8 mm at a temperature of 190° C. and an extrusion rate of 0.32 g/min, and an extruded and melted ethylene-α-olefin copolymer is taken up filament-like at a take-up increasing rate of 6.3 (m/min)/min. The melt tension can be changed, for example, by a pressure of an ethylene during polymerization in the production method described later, and when a pressure of ethylene during polymerization is reduced, the melt tension of the ethylene-α-olefin copolymer becomes high. The melt tension can be also increased by implementing prepolymerization under the suitable condition.

The elongational viscosity nonlinear index k representing a strength of strain hardening of the ethylene-α-olefin copolymer of the present invention is preferably larger than 0.4, more preferably larger than 0.5, further preferably larger than 0.6, most preferably larger than 0.7. Small k means that sufficient strain hardening is not exhibited, and inconvenience occurs in processing at various moldings in some cases.

The elongational viscosity nonlinear index k is a value calculated as a slope of ln α(t) during t=1.5 seconds to 2.5 seconds, for a curve:

$$\alpha(t)\sigma_1(t)/\sigma_{0.1}(t) \qquad (5)$$

obtained by dividing a viscosity-time curve $\sigma_1(t)$ of a melted resin when monoaxially elongated at a temperature of 130° C. and a strain rate of 1 $s^{-1}$ at Hencky strain by a viscosity-time curve $\sigma_{0.1}(t)$ of a melted resin when monoaxially elongated at a temperature of 130° C. and a strain rate of 0.1 $s^{-1}$ at Hencky strain.

Measurement of the viscosity-time curve σ(t) of a melted resin is performed using a viscoelasticity measuring apparatus (e.g. ARES manufactured by TA Instrument etc.). The measurement is performed under the nitrogen atmosphere.

The second ethylene-α-olefin copolymer of the present invention is such that the elongational viscosity nonlinear index ratio k1/k2 which is a ratio of a strength of strain hardening at a high strain region to a strength of strain hardening at a low strain region satisfies the relation of the equation (6):

$$0.084 \times \ln(MFR) + 0.69 < k1/k2 < 0.126 \times \ln(MFR) + 1.03 \qquad (6).$$

The ratio satisfies preferably the relation of the equation (6)' and satisfies more preferably the relation of the equation (6)".

$$0.090 \times \ln(MFR) + 0.73 < k1/k2 < 0.121 \times \ln(MFR) + 0.99 \qquad (6)'$$

$$0.095 \times \ln(MFR) + 0.77 < k1/k2 < 0.116 \times \ln(MFR) + 0.95 \qquad (6)''$$

Herein, k1 is a slope of ln α(t) during a time t=2.0 seconds to 2.5 seconds, and k2 is a slope of ln α(t) during a time t=1.5 seconds to 2.0 seconds. That is, the elongational viscosity nonlinear index ratio k1/k2 becomes a large value when sufficient strain hardening is exhibited also at a high strain region, and becomes a small value when strain hardening is insufficient at a high strain region. In the previous ethylene-α-olefin copolymer, strain hardening at a high strain region was insufficient. A more preferable ethylene-α-olefin copolymer in the present invention surprisingly exhibits high strain hardening property also at a high strain region.

Although the reason is unknown, the elongational viscosity nonlinear index ratio has strong dependency on MFR, and when measurement data were plotted in order to investigate its trend, it was seen that a straight line is very good approximation, with ln(MFR) as abscissa against k1/k2 as ordinate. Regarding the relation of the equation (6), for an approximation equation k1/k2=0.1053×ln(MFR)+0.8594 obtained by fitting all data of Examples which were plotted with MFR as abscissa against k1/k2 as ordinate, by y=Aln(x)+B using Microsoft Excel, 20% of each value of a coefficient A and a coefficient B obtained upon fitting was added to a coefficient A or a coefficient B of an approximation equation, thereby an upper limit was derived, and the 20% was subtracted from a coefficient A or a coefficient B of an approximation equation, thereby a lower limit was derived. The equations (6)' and (6)" were derived by the entirely the same method as that of the equation (6) except that a part of adding or subtracting 20% of an absolute value of A or B was each changed to 15% and 10%.

It is preferable that the first ethylene-α-olefin copolymer of the present invention satisfy the equation (6).

The catalyst for producing the ethylene-α-olefin copolymer of the present invention is a catalyst for copolymerizing ethylene with an α-olefin, formed by bringing the following component (A1), the following component (A2), the following component (B), and the following component (C) into contact with each other, wherein the molar ratio ((A1)/(A2)) of the component (A1) to the component (A2) is from 1 to 90:

component (A1): a transition metal component represented by the following general formula (1),

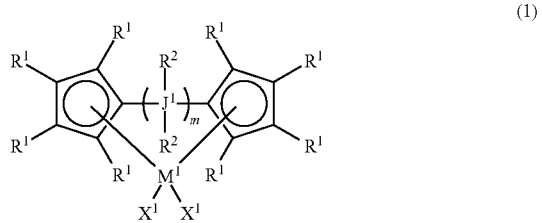

wherein $M^1$ represents a transition metal atom of Group 4 in the periodic table of the elements; $J^1$ represents an atom of Group 14 in the periodic table of the elements: m represents an integer of 1 to 5; $X^1$, $R^1$, and $R^2$ are the same or different, and each independently represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms; the $X^1$ groups may be the same or different; the $R^1$ groups may be the same or different; and the $R^2$ groups may be the same or different, component (A2): a transition metal compound represented by the following general formula (2),

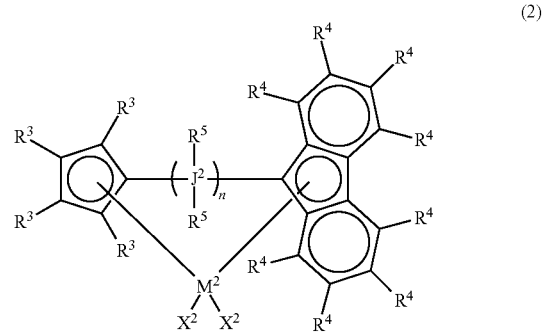

wherein $M^2$ represents a transition metal atom of Group 4 in the periodic table of the elements; $J^2$ represents an atom of Group 14 in the periodic table of the elements; n represents an integer of 1 to 5; $X^2$, $R^3$, $R^4$, and $R^5$ are the same or different, and each independently represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms; the $X^2$ groups may be the same or different; the $R^3$ groups may be the same or different; the $R^4$ groups may be the same or different; and the $R^5$ groups may be the same or different;

component (B): a catalyst component formed by bringing the following component (b1), the following component (b2), and the following component (b3) into contact with each other;

(b1): a compound represented by the following general formula (3),

$$M^3 L_x \qquad (3)$$

wherein $M^3$ represents a lithium atom, a sodium atom, a potassium atom, a rubidium atom, a cesium atom, a beryllium atom, a magnesium atom, a calcium atom, a strontium atom, a barium atom, a zinc atom, a germanium atom, a tin atom, a lead atom, an antimony atom, or a bismuth atom; x represents a number corresponding to the valence of $M^3$; L represents a hydrogen atom, a halogen atom, or an optionally substituted hydrocarbyl group having 1 to 20 carbon atoms; and when there are two or more L, they may be the same or different, (b2): a compound represented by the following general formula (4),

$$R^6_{t-1} T^1 H \qquad (4)$$

wherein $T^1$ represents an oxygen atom, a sulfur atom, a nitrogen atom, or a phosphorous atom; t represents a number corresponding to the valence of $T^1$; $R^6$ represents a halogen atom, an electron-withdrawing group, a halogen atom-containing group, or a group containing an electron withdrawing group; and when there are two or more $R^6$, they may be the same or different, (b3): a compound represented by the following general formula (5),

$$R^7_{s-2} T^2 H_2 \qquad (5)$$

wherein $T^2$ represents an oxygen atom, a sulfur atom, a nitrogen atom, or a phosphorous atom; s represents a number corresponding to the valence of $T^2$; $R^7$ represents a halogen atom, a hydrocarbyl group having 1 to 20 carbon atoms, or a halogenated hydrocarbyl group having 1 to 20 carbon atoms, component (C): an organoaluminum compound.

$M^1$ in the general formula (1) and $M^2$ in the general formula (2) represent a transition metal atom of Group 4 in the periodic table of the elements, and examples thereof include a titanium atom, a zirconium atom, a hafnium atom, etc.

$J^1$ in the general formula (1) and $J^2$ in the general formula (2) represent an atom of Group 14 in the periodic table of elements. It is preferable that they be a carbon atom or a silicon atom.

Further, m in the general formula (1) and n in the general formula (2) are an integer of 1 to 5. It is preferable that m be 1 to 2. It is preferable that n be 1 to 2.

$X^1$, $R^1$, and $R^2$ in the general formula (1), and $X^2$, $R^3$, $R^4$, and $R^5$ in the general formula (2) are the same or different, and each independently represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms, the $X^1$ groups may be the same or different, the $R^1$ groups or the $R^2$ groups may be the same or different, the $X^2$ groups may be the same or different, and the $R^3$ groups or the $R^4$ groups may be the same or different.

Examples of the halogen atom of $X^1$, $R^1$, $R^2$, $X^2$, $R^3$, $R^4$, and $R^5$ include a fluorine atom, a chlorine atom, a bromine atom, an iodine atom, etc.

Examples of the optionally substituted hydrocarbyl group having 1 to 20 carbon atoms of $X^1$, $R^1$, $R^2$, $X^2$, $R^3$, $R^4$, and $R^5$ include an alkyl group having 1 to 20 carbon atoms, a halogenated alkyl group having 1 to 20 carbon atoms, an aralkyl group having 7 to 20 carbon atoms, an aryl group having 6 to 20 carbon atoms, etc.

Examples of the alkyl group having 1 to 20 carbon atoms include a methyl group, an ethyl group, a n-propyl group, an isopropyl group, a n-butyl group, a sec-butyl group, a tert-butyl group, a n-pentyl group, a neopentyl group, an isopentyl group, a n-hexyl group, a n-heptyl group, a n-octyl group, a n-decyl group, a n-nonyl group, a n-decyl group, a n-dodecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-eicosyl group, etc.

Examples of the halogenated alkyl group having 1 to 20 carbon atoms include a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group, a diiodomethyl group, a triiodomethyl group, a fluoroethyl group, a difluoroethyl group, a trifluoroethyl group, a tetrafluoroethyl group, a pentafluoroethyl group, a chloroethyl group, a dichloroethyl group, a trichloroethyl group, a tetrachloroethyl group, a pentaethyl group, a bromoethyl group, a dibromoethyl group, a tribromoethyl group, a tetrabromoethyl group, a pentabromoethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a perchloropropyl group, a perchlorobutyl group, a perchloropentyl group, a perchlorohexyl group, a perchlorooctyl group, a perchlorododecyl group, a perchloropentadecyl group, a perchloroeicosyl group, a perbromopropyl group, a perbromobutyl group, a perbromopentyl group, a perbromohexyl group, a perbromooctyl group, a perbromododecyl group, a perbromopentadecyl group, a perbromoeicosyl group, etc.

Examples of the aralkyl group having 7 to 20 carbon atoms include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (4,6-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenhyl)methyl group, a (2,3,4,6-tetramethylphenyl)methyl group, a (2,3 5,6-tetramethylphenyl)methyl group, a (pentamethylphenyl)methyl group, an (ethylphenyl)methyl group, a (n-propylpehnyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-decylphenyl)methyl group, a (n-tetradecylphenyl)methyl group, a naphthylmethyl group, an anthracenylmethyl group, a phenylethyl group, a phenylpropyl group, a phenylbutyl group, a diphenylmethyl group, a diphenylethyl group, a diphenylpropyl group, a diphenylbutyl group, etc. In addition, examples include halogenated aralkyl groups in which these aralkyl groups are substituted with a halogen atom such as a fluorine atom, a chlorine atom, a bromine atom, or an iodine atom.

Examples of the aryl group having 6 to 20 carbon atoms include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a diethylphenyl group, a triethylphenyl group, a n-propylphenyl group, an isopropylphenyl group, a n-butylphenyl group, a sec-butylphenyl group, a tort-butylphenyl group, a n-pentylphenyl group, a neopentylphenyl group, a n-hexylphenyl group, a n-octylphenyl group, a n-dooylphenyl group, a n-dodecylphenyl group, a n-tetradecylphenyl group, a naphthyl group, an anthracenyl group, etc. In addition, examples include halogenated aryl groups in which these aryl groups are substituted with a halogen atom such as a fluorine atom, a chlorine atom, a bromine atom, or an iodine atom.

Examples of the optionally substituted hydrocarbyl group having 1 to 20 carbon atoms include a hydrocarbyl group substituted with a hydrocarbylsilyl group, a hydrocarbyl group substituted with a hydrocarbylamino group, and a hydrocarbyl group substituted with a hydrocarybyloxy group.

Examples of the hydrocarbyl group substituted with a hydrocarbylsilyl group include a trimethylsilylmethyl group, a trimethylsilylethyl group, a trimethylsilylpropyl group, a trimethylsilylbutyl group, a trimethylsilylphenyl group, a bis(trimethylsilyl)methyl group, a bis(trimethylsilyl)ethyl group, a bis(trimethylsilyl)propyl group, a bis(trimethylsilyl)butyl group, a bis(trimethylsilyl)phenyl group, a triphenylsilylmethyl group, etc.

Examples of the hydrocarbyl group substituted with a hydrocarbylamino group include a dimethylaminomethyl group, a dimethylaminoethyl group, a dimethylaminopropyl group, a dimethylaminobutyl group, a dimethylaminophenyl group, a bis(dimethylamino)methyl group, a bis(dimethylamino)ethyl group, a bis(dimethylamino)propyl group, a bis(dimethylamino)butyl group, a bis(dimethylamino)phenyl group, a phenylaminomethyl group, a diphenylaminomethyl group, a diphenylaminophenyl group, etc.

Examples of the hydrocarbyl group substituted with a hydrocarbyloxy group include a methoxymethyl group, an ethoxymethyl group, a n-propoxymethyl group, an isopropoxymethyl group, a n-butoxymethyl group, a sec-butoxymethyl group, a tert-butoxymethyl group, a phenoxymethyl group, a methoxyethyl group, an ethoxyethyl group, a n-propoxyethyl group, an isopropoxyethyl group, a n-butoxyethyl group, a sec-butoxyethyl group, a tert-butoxyethyl group, a phenoxyethyl group, a methoxy-n-propyl group, an ethoxy-n-propyl group, a n-propoxy-n-propyl group, an isopropoxy-n-propyl group, a n-butoxy-n-propyl group, a sec-butoxy-n-propyl group, a tert-butoxy-n-propyl group, a phenoxy-n-propyl group, a methoxyisopropyl propyl group, an ethoxyisopropyl group, a n-propoxyisopropyl group, an isopropoxyisopropyl group, a n-butoxyisopropyl group, a sec-butoxyisopropyl group, a tert-butoxyisopropyl group, a phenoxyisopropyl group, a methoxyphenyl group, an ethoxyphenyl group, a n-propoxyphenyl group, an isopropoxyphenyl group, a n-butoxyphenyl group, a sec-butoxyphenyl group, a tert-butoxyphenyl group, a phenoxyphenyl group, etc.

Examples of the optionally substituted hydrocarbyloxy group having 1 to 20 carbon atoms of $X^1$, $R^1$, $R^2$, $X^2$, $R^3$, $R^4$, and $R^5$ include an alkoxy group having 1 to 20 carbon atoms, an aralkyloxy group having 7 to 20 carbon atoms, an aryloxy group having 6 to 20 aryloxy groups, etc.

Examples of the alkoxy group having 1 to 20 carbon atoms include a methoxy group, an ethoxy group, a n-propoxy group, an isopropoxy group, a n-butoxy group, a sec-butoxy group, a tert-butoxy group, a n-pentyloxy group, a neopentyloxy group, a n-hexyloxy group, a n-octyloxy group, a n-nonyloxy group, a n-decyloxy group, a n-undecyloxy group, a n-dodecyloxy group, a n-tridecyloxy group, a n-tetradecyloxy group, a n-pentadecyloxy group, a n-hexadecyloxy group, a n-heptadecyloxy group, a n-heptadecyloxy group, a n-octadecyloxy group, a n-nonadecyloxy group, a n-eicosoxy group, etc. In addition, examples include halogenated alkoxy groups in which these alkoxy groups are substituted with a halogen atom such as a fluorine atom, a chlorine atom, a bromine atom, or an iodine atom.

Examples of the aralkyloxy group having 7 to 20 carbon atoms include a benzyloxy group, a (2-methylphenyl)methoxy group, a (3-methylpheyl)methoxy group, a (4-methylphenyl)methoxy group, a (2,3-diemthylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl) methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl) methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a (n-tetradecylphenyl)methoxy group, a naphthylmethoxy group, an anthracenylmethoxy group, etc. In addition, examples include halogenated aralkyloxy groups in which these aralkyloxy groups are substituted with a halogen atom such as a fluorine atom, a chlorine atom, a bromine atom, or an iodine atom.

Examples of the aryloxy group having 6 to 20 carbon atoms include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group, an anthracenoxy group, etc. In addition, examples include halogenated aryloxy groups in which these aryloxy groups are substituted with a halogen atom such as a fluorine atom, a chlorine atom, a bromine atom, or an iodine atom.

The hydrocarbylsilyl group having 1 to 20 carbon atoms of $X^1$, $R^1$, $R^2$, $X^2$, $R^3$, $R^4$, and $R^5$ is a silyl group substituted with a hydrocarbyl group having 1 to 20 carbon atoms, and examples of the hydrocarbyl group having 1 to 20 carbon atoms include an alkyl group having 1 to 20 carbon atoms, an aryl group having 6 to 20 carbon atoms, etc. Examples of the hydrocarbylsilyl, group having 1 to 20 carbon atoms include a monohydrocarbylsilyl group having 1 to 20 carbon atoms, a dihydrocarbylsilyl group having 2 to 20 carbon atoms, a trihydrocarbylsilyl group having 3 to 20 carbon atoms, etc., examples of the monohydrocarbylsilyl group having 1 to 20 carbon atoms include a methylsilyl group, an ethylsilyl group, a n-propylsilyl group, an isopropylsilyl group, a n-butylsilyl group, a sec-butylsilyl group, a tert-butylsilyl group, an isobutylsilyl group, a n-pentylsilyl group, a n-hexylsilyl group, an phenylsilyl group, etc., examples of the dihydrocarbylsilyl group having 2 to 20 carbon atoms include a dimethylsilyl group, a diethylsilyl group, a di-n-propylsilyl group, a diisopropylsilyl group, a di-n-butylsilyl group, a di-sec-butylsilyl group, a di-tert-butylsilyl group, a diisobutylsilyl group, a diphenylsilyl group, etc., and examples of the trihydrocarbylsilyl having 3 to 20 carbon atoms include a trimethylsilyl group, a triethylsilyl group, a tri-n-propylsilyl group, a triisopropylsilyl group, a tri-n-butylsilyl group, a tri-sec-butylsilyl group, a tri-tert-butylsilyl group, a triisobutylsilyl group, a tert-butyl-dimethylsilyl group, a tri-n-pentylsilyl group, a tri-n-hexylsilyl group, a tricyclohexylsillyl group, a triphenylsilyl group, etc.

The hydrocarbylamino group having 1 to 20 carbon atoms of $X^1$, $R^1$, $R^2$, $X^2$, $R^3$, $R^4$, and $R^5$ is an amino group substituted with a hydrocarbyl group having 1 to 20 carbon atoms, and examples of the hydrocarbyl group having 1 to 20 carbon atoms include an alkyl group having 1 to 20 carbon atoms, an aryl group having 6 to 20 carbon atoms, an aralkyl group having 7 to 20 carbon atoms, etc. Examples of the hydrocarbylamino group having 1 to 20 carbon atoms include a monohydrocarbylamino group having 1 to 20 carbon atoms, a dihydrocarbylamino group having 2 to 20 carbon atoms, etc., examples of the monohydrocarbylamino group having 1 to 20 carbon atoms include a methylamino group, an ethylamino group, a n-propylamino group, an isopropylamino group, a n-butylamino group, a sec-butylamino group, a tert-butylamino group, an isobutylamino group, a n-hexylamino group, a n-octylamino group, a n-decylamino group, a phenylamino group, a benzylamino group, etc., and examples of the dihydrocarbylamino group having 2 to 20 carbon atoms include a dimethylamino group, a diethylamino group, a di-n-propylamino group, a diisopropylamino group, a di-n-butylamino group, a di-sec-butylamino group, a di-tert-butylamino group, a di-isobutylamino group, a tert-butylisopropylamino group, a di-n-hexylamino group, a di-n-octylamino group, a di-n-decylamino group, a diphenylamino group, a dibenzylamino group, a tert-butylisopropylamino group, a phenylethylamino group, a phenylpropylamino group, a phenylbutylamino group, a pyrrolyl group, a pyrrolidinyl group, a piperidinyl group, a carbazolyl group, a dihydroisoindolyl group, etc.

$X^1$ is preferably a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenylphenoxy group, or a benzyl group.

$R^1$ is preferably a hydrogen atom, or an alkyl group having 1 to 6 carbon atoms, more preferably a hydrogen atom, or an alkyl group having 1 to 4 carbon atoms, further preferably a hydrogen atom.

$R^2$ is preferably an alkyl group having 1 to 6 carbon atoms, more preferably an alkyl group having 1 to 4 carbon atoms.

$X^2$ is preferably a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenylphenoxy group, or a benzyl group.

$R^3$ is preferably a hydrogen atom, or an alkyl group having 1 to 6 carbon atoms, more preferably a hydrogen atom, or an alkyl group having 1 to 4 carbon atoms, further preferably a hydrogen atom.

$R^4$ is preferably a hydrogen atom, or an alkyl group having 1 to 6 carbon atoms, more preferably a hydrogen atom, or an alkyl group having 1 to 4 carbon atoms, further preferably a hydrogen atom.

$R^5$ is preferably an alkyl group having 1 to 6 carbon atoms, more preferably an alkyl group having 1 to 4 carbon atoms.

Examples of the transition metal compound of the component (A1) represented by the general formula (1), when $M^1$ is a zirconium atom, and a $X^1$ is a chlorine atom, include methylenebis(cyclopentadienyl)zirconium dichloride, isopropylidenebis(cyclopentadienyl)zirconium dichloride, (methyl)(phenyl)methylenebis(cyclopentadienyl)zirconium dichloride, diphenylmethylenebis(cyclopentadienyl)zirconium dichloride, ethylenebis(cyclopentadienyl)zirconium dichloride, methylenebis(methylcyclopentadienyl)zirconium dichloride, isopropylidenebis(methylcyclopentadienyl)zirconium dichloride, (methyl)(phenyl)methylenebis(methylcyclopentadienyl)zirconium dichloride, diphenylmethylenebis(methylcyclopentadienyl)zirconium dichloride, ethylenebis(methylcyclopentadienyl)zirconium dichloride, methylene(cyclopnetadienyl)(methylcyclopentadienyl)zirconium dichloride, isopropylidene(cyclopentadienyl)(methylcyclopentadienyl)zirconium dichloride, (methyl)(phenyl)methylene(cyclopentadienyl)(methylcyclopentadienyl)zirconium dichloride, diphenylmethylene(cyclopentadienyl)(methylcyclopentadienyl) zirconium dichloride, ethylene(cyclopentadienyl)(methylcyclopentadienyl)zirconium dichloride, methylenebis(2,3-dimethylcyclopentadienyl)zirconium dichloride, methylenebis(2,4-dimethylcyclopentadienyl)zirconium dichloride, methylenebis(2,5-dimethylcyclopentadienyl)zirconium dichloride, methylenebis(3,4-dimethylcyclopentadienyl)zirconium dichloride, isopropylidenebis(2,3-dimethylcyclopentadienyl)zirconium dichloride, isopropylidenebis(2,4-dimethylcyclopentadienyl)zirconium dichloride, isopropylidenebis(2,5-dimethylcyclopentadienyl)zirconium dichloride, isopropylidenebis(3,4-dimethylcyclopentadienyl)zirconium dichloride, (methyl)(phenyl)methylenebis(2,3-dimethylcyclopentadienyl)zirconium dichloride, (methyl)(phenyl)methylenebis(2,4-dimethylcyclopentadienyl)zirconium dichloride, (methyl)(phenyl)methylenebis(2,5-dimethylcyclopentadienyl)zirconium dichloride, (methyl)(phenyl)methylenebis(3,4-dimethylcyclopentadienyl) zirconium dichloride, diphenylmethylenebis(2,3-dimethylcyclopentadienyl)zirconium dichloride, diphenylmethylenebis(2,4-dimethylcyclopentadienyl)zirconium dichloride, diphenylmethylenebis(2,5-dimethylcyclopentadienyl)zirconium dichloride, diphenylmethylenebis(3,4-dimethylcyclopentadienyl)zirconium dichloride, ethylenebis(2,3-dimethylcyclopentadienyl)zirconium dichloride, ethylenebis(2,4-dimethylcyclopentadienyl)zirconium dichloride, ethylenebis(2,5-dimethylcyclopentadienyl) zirconium dichloride, ethylenebis(3,4-dimethylcyclopentadienyl)zirconium dichloride, dimethylsilanediylbis(cyclopentadienyl)zirconium dichloride, diethylsilanediylbis(cyclopentadienyl)zirconium dichloride, di(n-propyl)silanediylbis(cyclopentadienyl)zirconium dichloride, diisopropylsilanediylbis(cyclopentadienyl)zirconium dichloride, dicyclohexylsilanediylbis(cyclopentadienyl)zirconium dichloride, diphenylsilanediylbis(cyclopentadienyl) zirconium dichloride, di(p-tolyl)silanediylbis(cyclopentadienyl)zirconium dichloride, divinylsilanediylbis(cyclopentadienyl)zirconium dichloride, diallylsilanediylbis(cyclopentadienyl)zirconium dichloride, (methyl)(vinyl)silanediylbis(cyclopentadienyl)zirconium dichloride, (allyl)(methyl)silanediylbis(cyclopentadienyl)zirconium dichloride, (ethyl)(methyl)silanediylbis(cyclopentadienyl)zirconium dichloride, (methyl)(n-propyl)silanediylbis(cyclopentadienyl)zirconium dichloride, (methyl)(isopropyl)silanediylbis(cyclopentadienyl)zirconium dichloride, (cyclohexyl)(methyl)bis(cyclopentadienyl)zirconium dichloride, (methyl)(phenyl)silanediylbis(cyclopentadienyl)zirconium dichloride, dimethylsilanediylbis(methylcyclopentadienyl)zirconium dichloride, diethylsilanediylbis(methylcyclopentadienyl)zirconium dichloride, di(n-propyl)silanediylbis(methylcyclopentadienyl)zirconium dichloride, diisopropylsilanediylbis(methylcyclopentadienyl)zirconium dichloride, dicyclohexylsilanediylbis(methylcyclopentadienyl)zirconium dichloride, diphenylsilanediylbis(methylcyclopentadienyl)zirconium dichloride, (ethyl)(methyl)silanediylbis(methylcyclopentadienyl)zirconium dichloride, (methyl)(n-propyl)silanediylbis(methylcyclopentadienyl) zirconium dichloride, (methyl)(isopropyl)silanediylbis(methylcyclopentadienyl)zirconium dichloride, (cyclohexyl)(methyl)bis(methylcyclopentadienyl)zirconium dichloride, (methyl)(phenyl)silanediylbis(methylcyclopentadienyl)zirconium dichloride, dimethylsilanediyl(cyclopentadienyl)(methylcyclopentadienyl) zirconium dichloride, diethylsilanediyl(cyclopentadienyl)(methylcyclopentadienyl) zirconium dichloride, di(n-propyl)silanediyl(cyclopentadienyl)(methylcylopentadienyl)zirconium dichloride, diisopropylsilanediyl(cyclopentadienyl)(methylcyclopentadienyl)zirconium dichloride, dicyclohexylsilanediyl(cyclopentadienyl)(methylcyclopentadienyl)zirconium dichloride, diphenylsilanediyl(cyclopentadienyl)(methylcyclopentadienyl)zirconium dichloride, (ethyl)(methyl)silanediyl(cyclopentadienyl)(methylcyclopentadienyl)zirconium dichloride, (methyl)(n-propyl)silanediyl(cyclopentadienyl)(methylcyclopentadienyl) zirconium dichloride, (methyl)(isopropyl)silanediyl(cyclopentadienyl)(methylcyclopentadienyl)zirconium dichloride, (cyclohexyl)(methyl)(cyclopentadienyl)(methylcyclopentadienyl)zirconium dichloride, (methyl)(phenyl)silanediyl(cyclopentadienyl)(methylcyclopentadienyl)zirconium dichloride, dimethylsilanediylbis(2,3-dimethylcyclopentadienyl)zirconium dichloride, dimethylsilanediylbis(2,4-dimethylcyclopentadienyl)zirconium dichloride, dimethylsilanediylbis(2,5-dimethylcyclopentadienyl)zirconium dichloride, dimethylsilanediylbis(3,4-dimethylcyclopentadienyl)zirconium dichloride, diethylsilanediylbis(2,3-dimethylcyclopentadienyl)zirconium dichloride, diethylsilanediylbis(2,4-dimehyicyclopentadienyl)zirconium dichloride, diethylsilanediylbis(2,5-dimethylcyclopentadienyl)zirconium dichloride, diethylsilanediylbis(3,4-dimethylcyclopentadienyl)zirconium dichloride, di(n-propyl)silanediylbis(2,3-dimethylcyclopentadienyl)zirconium dichloride, di-n-propyl)silanediylbis(2,4-dimethylcyclopentadienyl) zirconium dichloride, di(n-propyl)silanediylbis(2,5-dimethylcyclopentadienyl)zirconium dichloride, di(n-propyl)silanediylbis(3,4-diemthylcyclopentadienyl) zirconium dichloride, diisopropylsialnediylbis(2,3-dimethylcyclopentadienyl)zirconium dichloride, diisopropylsilanediylbis(2,4-dimethylcyclopentadienyl)zirconium dichloride, diisopropylsilanediylbis(2,5-dimethylcyclopentadienyl)zirconium dichloride, diisopropylsilanediylbis(3,4-dimethylcyclopentadienyl)zirconium dichloride, dicyclohexylsilanediylbis(2,3-dimethylcyclopentadienyl)zirconium dichloride, dicyclohexylsilanediylbis(2,4-dimethylcyclopentadienyl)zirconium dichloride, dicyclohexylsilanediylbis(2,5-dimethylcyclopentadienyl)zirconium dichloride, dicyclohexylsilanediylbis(3,4-dimethylcyclopentadienyl)zirconium dichloride, diphenylsilanediylbis(2,3-dimethylcyclopentadienyl)zirconium dichloride, diphenylsilanediylbis(2,4-dimethylcyclopentadienyl)zirconium dichloride, diphenylsilanediylbis(2,5-dimethylcyclopentadienyl)zirconium chloride, diphenylsilanediylbis(3,4-dimethylcyclopentadienyl)zirconium dichloride, (ethyl)(methyl)silanediylbis(2,3-dimethylcyclopentadienyl)zirconium dichloride, (ethyl)(methyl)silanediylbis(2,4-dimethylcyclopentadienyl)zirconium dichloride, (ethyl)(methyl)silanediylbis(2,5-dimethylcyclopentadienyl)zirconium dichloride, (ethyl)(methyl)silanediylbis(3,4-dimethylcyclopentadienyl) zirconium dichloride, (methyl)(n-propyl)silanediylbis(2,3-dimethylcyclopentadienyl)zirconium dichloride, (methyl)(n-propyl)silanediylbis(2,4-dimethylcyclopentadienyl) zirconium dichloride, (methyl)(n-propyl)silanediylbis(2,5-dimethylcyclopentadienyl)zirconium dichloride, (methyl)(n-propyl)silanediylbis(3,4-dimethylcyclopentadienyl) zirconium dichloride, (methyl)(isopropyl)silanediylbis(2,3-dimethylcyclopentadienyl)zirconium dichloride, (methyl)(isopropyl)silanediylbis(2,4-dimethylcyclopentadienyl) zirconium dichloride, (methyl)(isopropyl)silanediylbis(2,5-dimethylcyclopentadienyl)zirconium dichloride, (methyl)(isopropyl)silanediylbis(3,4-dimethylcyclopentadienyl) zirconium dichloride, (cyclohexyl)(methyl)bis(2,3-dimethylcyclopentadienyl)zirconium dichloride, (cyclohexyl)(methyl)bis(2,4-dimethylcyclopnetadienyl)zirconium dichloride, (cyclohexyl)(methyl)bis(2,5-dimethylcyclopentadienyl)zirconium dichloride, (cyclohexyl)(methyl)bis(3,4-dimethylcyclopentadienyl)zirconium dichloride, (methyl)(phenyl)silanediylbis(2,3-dimethylcyclopentadienyl)zirconium dichloride, (methyl)(phenyl)silanediylbis(2,4-dimethylcyclopentadienyl)zirconium dichloride, (methyl)(phenyl)silanediylbis(2,5-dimethylcyclopentadienyl) zirconium dichloride, (methyl)(phenyl)silanediylbis(3,4-dimethylcyclopentadienyl)zirconium dichloride, etc.

A substituted body of the $\eta^5$-cyclopentadienyl group in the above exemplification, when a crosslinking group is at a 1-position, in the case of a monosubstituted body, includes substituted bodies at a 2-position, a 3-position, a 4-position, and a 5-position, and includes similarly all combinations when a crosslinking position is other than a 1-position. The substituent body includes similarly all combinations of substituents and crosslinking positions, also in the case of a di- or more substituted body. In addition, examples include compounds in which dichloride of $X^1$ of the transition metal compound is changed with difluoride, dibromide, diiodide, dimethyl, diethyl, diisopropyl, dimethoxide, diethoxide, dipropoxide, dibutoxide, bis(trifluoromethoxide), diphenyl, diphenoxide, bis(2,6-di-tert-butylphenoxide), bis(3,4,5-trifluorophenoxide), bis(pentafluorophenoxide), bis(2,3,5,6-tetrafluoro-4-pentafluorophenylphenoxide), dibenzyl, etc. Further, examples include compounds in which zirconium of $M^1$ of the transition metal compound is changed with titanium or hafnium.

The transition metal compound of the component (A1) represented by the general formula (1) is preferably dimethylsilanediylbis(cyclopentadienyl)zirconium dichloride, or isopropylidenebis(cyclopentadienyl)zirconium dichloride.

Examples of the transition metal compound of the component (A2) represented by the general formula (2), when $M^2$ is a zirconium atom, $X^2$ is a chlorine atom, and a crosslinking group $[-(J^2(R^5)_2)_n-]$ is a diphenylmethylene group, include diphenylmethylene(1-cyclopentadienyl)(9-fluorenyl)zirconium dichloride, diphenylmethylene(2-methyl-1-cyclopentadienyl)(9-fluorenyl)zirconium dichloride, diphenylmethylene(3-methyl-1-cyclopentadienyl)(9-fluorenyl)zirconium dichloride, diphenylmethylene(2,4-dimethyl-1-cyclopentadienyl)(9-fluorenyl)zirconium dichloride, diphenylmethylene(2,5-dimethyl-1-cyclopentadienyl)(9-fluorenyl)zirconium dichloride, diphenylmethylene(3,4-dimethyl-1-cyclopentadienyl)(9-fluorenyl)zirconium dichloride, diphenylmethylene(2,3,4-trimethyl-1-cyclopentadienyl)(9-fluorenyl)zirconium dichloride, diphenylmethylene(2,3,5-trimethyl-1-cyclopentadienyl)(9-fluorenyl)zirconium dichloride, diphenylmethylene(3,4,5-trimethyl-1-cyclopentadienyl)(9-fluorenyl)zirconium dichloride, diphenylmethylene(2,3,4,5-tetramethyl-1-cyclopentadienyl)(9-fluorenyl) zirconium dichloride, diphenylmethylene(2-ethyl-1-cyclopentadienyl)(9-fluorenyl)zirconium dichloride, diphenylmethylene(3-ethyl-1-cyclopentadienyl)(9-fluorenyl)zirconium dichloride, diphenylmethylene(2,4-diethyl-1-cyclopentadienyl)(9-fluorenyl)zirconium dichloride, diphenylmethylene(2,5-diethyl-1-cyclopentadienyl)(9-fluorenyl) zirconium dichloride, diphenylmethylene(3,4-diethyl-1-cyclopentadienyl)(9-fluorenyl)zirconium dichloride, diphenylmethylene(2,3,4-triethyl-1-cyclopentadienyl)(9-fluorenyl)zirconium dichloride, diphenylmethylene(2,3,5-triethyl-1-cyclopentadienyl)(9-fluorenyl)zirconium dichloride, diphenylmethyl(3,4-5-triethyl-1-cyclopentadienyl)(9-fluorenyl)zirconium dichloride, diphenylmethylene(2,3,4,5-tetraethyl-1-cyclopentadienyl)(9-fluorenyl)zirconium dichloride, diphenylmethylene(2-n-propyl-1-cyclopentadienyl)(9-fluorenyl)zirconium dichloride, diphenylmethylene (3-n-propyl-1-cyclopentadiethyl)(9-fluorenyl)zirconium dichloride, diphenylmethylene(2,4-di-n-propyl-1-cyclopentadienyl)(9-fluorenyl)zirconium dichloride, diphenylmethylene(2,5-di-n-propyl-1-cyclopentadienyl)(9-fluorenyl)zirconium dichloride, diphenylmethylene(3,4-di-n-propyl-1-cyclopentadienyl)(9-fluorenyl)zirconium dichloride, diphenylmethylene(2,3,4-tri-n-propyl-1-cyclopentadienyl)(9-fluorenyl)zirconium dichloride, diphenylmethylene(2,3,5-tri-n-propyl-1-cyclopentadienyl)(9-fluorenyl)zirconium dichloride, diphenylmethylene(3,4,5-tri-n-propyl-1-1cyclopentadienyl)(9-fluorenyl)zirconium dichloride, diphenylmethylene(2,3,4,5-tetra-n-propyl-1-cyclopentadienyl)(9-fluorenyl)zirconium dichloride, diphenylmethylene(2-isopropyl-1-cyclopentadienyl)(9-fluorenyl)zirconium dichloride, diphenylmethylene(3-isopropyl-1-cyclopentadienyl)(9-fluorenyl)zirconium dichloride, diphenylmethylene(2,4-diisopropyl-1-cyclopentadienyl)(9-fluorenyl)zirconium dichloride, diphenylmethylene(2,5-diisopropyl-1-cyclopentadienyl)(9-fluorenyl)zirconium dichloride, diphenylmethylene(3,4-diisopropyl-1-cyclopentadienyl)(9-fluorenyl)zirconium dichloride, diphenylmethylene(2,3,4-triisopropyl-1-cyclopentadienyl)(9-fluorenyl)zirconium dichloride, diphenylmethylene(2,3,5-triisopropyl-1-cyclopentadienyl)(9-fluorenyl)zirconium dichloride, diphenylmethylene(3,4,5-triisopropyl-1-cyclopentadienyl)(9-fluorenyl)zirconium dichloride, diphenylmethylene(2,3,4,5-tetraisopropyl-1-cyclopentadienyl)(9-fluorenyl)zirconium dichloride, diphenylmethylene(2-phenyl-1-cyclopentadienyl)(9-fluorenyl)zirconium dichloride, diphenylmethylene(3-phenyl-1-cyclopentadienyl)(9-fluorenyl)zirconium dichloride, diphenylmethylene(2,4-diphenyl-1-cyclopentadienyl)(9-fluorenyl)zirconium dichloride, diphenylmethyelene(2,5-diphenyl-1-cyclopentadienyl)(9-fluorenyl)zirconium dichloride, diphenylmethylene(3,4-diphenyl-1-cyclopentadienyl)(9-fluorenyl)zirconium dichloride, diphenylmethylene(2,3,4-triphenyl-1-cyclopentadienyl)(9-fluorenyl)zirconium dichloride, diphenylmethylene(2,3,5-triphenyl-1-cyclopentadienyl)(9-fluorenyl)zirconium dichloride, diphenylmethylene(3,4,5-triphenyl-1-cyclopentadienyl)(9-fluorenyl)zirconium dichloride, diphenylmethylene(2,3,4,5-tetraphenyl-1-cyclopentadienyl)(9-fluorenyl)zirconium dichloride, diphenylmethylene(2-trimethylsilyl-1-cyclopentadienyl)(9-fluorenyl)zirconium dichloride, diphenylmethylene(3-trimethylsilyl-1-cyclopentadienyl)(9-fluorenyl)zirconium dichloride, diphenylmethylene(2,4-bis(trimethylsilyl)-1-cyclopentadienyl)(9-fluorenyl)zirconium dichloride, diphenylmethylene(2,5-bis(trimethylsilyl)-1-cyclopentadienyl)(9-fluorenyl)zirconium dichloride, diphenylmethylene(3,4-bis(trimethylsilyl)-1-cyclopentadienyl)(9-fluorenyl)zirconium dichloride, diphenylmethylene(2,3,4-tris(trimethylsilyl)-1-cyclopentadienyl)(9-fluorenyl)zirconium dichloride, diphenylmethylene(2,3,5-tris(trimethylsilyl)-1-cyclopentadienyl)(9-fluorenyl)zirconium dichloride, diphenylmethylene(3,4,5-tris(trimethylsilyl)-1-cyclopentadienyl)(9-fluorenyl)zirconium dichloride, diphenylmethylene(2,3,4,5-tetrakis(trimethylsilyl)-1-cyclopentadienyl)(9-fluorenyl)zirconium dichloride, diphenylmethylene(1-cyclopentadienyl)(2,7-dimethyl-9-fluorenyl)zirconium dichloride, diphenylmethylene(2-methyl-1-cyclopentadienyl)(2,7-dimethyl-9-fluorenyl)zirconium dichloride, diphenylmethylene(3-methyl-1-cyclopentadienyl)(2,7-dimethyl-9-fluorenyl)zirconium dichloride, diphenylmethylene(2,4-dimethyl-1-cyclopentadienyl)(2,7-dimethyl-9-fluorenyl)zirconium dichloride, diphenylmethylene(2,5-dimethyl-1-cyclopentadienyl)(2,7-dimethyl-9-fluorenyl)zirconium dichloride, diphenylmethylene(3,4-dimethyl-1-cyclopentadienyl)(2,7-dimethyl-9-fluorenyl)zirconium dichloride, diphenylmethylene(2,3,4-trimethyl-1-cyclopentadienyl)(2,7-dimethyl-9-fluorenyl)zirconium dichloride, diphenylmethylene(2,3,5-trimethyl-1-cyclopentadienyl)(2,7-dimethyl-9-fluorenyl)zirconium dichloride, diphenylmethylene(3,4,5-trimethyl-1-cyclopentadienyl)(2,7-dimethyl-9-fluorenyl)zirconium dichloride, diphenylmethylene(2,3,4,5-tetramethyl-1-cyclopentadienyl)(2,7-dimethyl-9-fluorenyl)zirconium dichloride, diphenylmethylene(2-ethyl-1-cyclopentadienyl)(2,7-dimethyl-9-fluorenyl)zirconium dichloride, diphenylmethylene(3-ethyl-1-cyclopentadienyl)(2,7-dimethyl-9-fluorenyl)zirconium dichloride, diphenylmethylene(2,4-diethyl-1-cyclopentadienyl)(2,7-dimethyl-9-fluorenyl)zirconium dichloride, diphenylmethylene(2,5-diethyl-1-cyclopentadienyl)(2,7-dimethyl-9-fluorenyl)zirconium dichloride, diphenylmethylene(3,4-diethyl-1-cyclopentadienyl)(2,7-dimethyl-9-fluorenyl)zirconium dichloride, diphenylmethylene(2,3,4-triethyl-1-cyclopentadienyl)(2,7-dimethyl-9-fluorenyl)zirconium dichloride, diphenylmethylene(2,3,5-triethyl-1-cyclopentadienyl)(2,7-dimethyl-9-fluorenyl)zirconium dichloride, diphenylmethylene(3,4,5-triethyl-1-cyclopentadienyl)(2,7-dimethyl-9-fluorenyl)zirconium dichloride, diphenylmethylene(2,3,4,5-tetraethyl-1-cyclopentadienyl)(2,7-dimethyl-9-fluorenyl)zirconium dichloride, diphenylmethylene(2-n-propyl-1-cyclopentadienyl)(2,7-dimethyl-9-fluorenyl)zirconium dichloride, diphenylmethylene (3-n-propyl-1-cyclopentadienyl)(2,7-dimethyl-9-fluorenyl)zirconium dichloride, diphenylmethylene(2,4-di-n-propyl-1-cyclopentadienyl)(2,7-dimethyl-9-fluorenyl)zirconium dichloride, diphenylmethylene(2,5-di-n-propyl-1-cylopentadienyl)(2,7-dimethyl-9-fluorenyl)zirconium dichloride, diphenylmethylene(3,4-di-n-propyl-1-cyclopentadienyl)(2,7-dimethyl-9-fluorenyl)zirconium dichloride, diphenylmethylene(2,3,4-tri-n-propyl-1-cyclopentadienyl)(2,7-dimethyl-9-fluorenyl)zirconium dichloride, diphenylmethylene(2,3,5-tri-n-propyl-1-cyclopentadienyl)(2,7-dimethyl-9-fluorenyl)zirconium dichloride, diphenylmethylene (3,4-5-tri-n-propyl-1-cyclopentadienyl)(2,7-dimethyl-9-fluorenyl)zirconium dichloride, diphenylmethylene(2,3,4,5-tetra-n-propyl-1-cyclopentadienyl)(2,7-dimethyl-9-fluorenyl)zirconium dichloride, diphenylmethylene (2-isopropyl-1-cyclopentadienyl)(2,7-dimethyl-9-fluorenyl)zirconium dichloride, diphenylmethylene(3-isopropyl-1-cyclopentadienyl)(2,7-dimethyl-9-fluorenyl)zirconium dichloride, diphenylmethylene(2,4-diisopropyl-1-cyclopentadienyl)(2,7-dimethyl-9-fluorenyl)zirconium dichloride, diphenylmethylene(2,5-diisopropyl-1-cyclopentadienyl)(2,7-dimethyl-9-fluorenyl)zirconium dichloride, diphenylmethylene(3,4-diisopropyl-1-cyclopentadienyl)(2,7-dimethyl-9-fluorenyl)zirconium dichloride, diphenylmethylene(2,3,4-triisopropyl-1-cyclopentadienyl)(2,7-dimethyl-9-fluorenyl)zirconium dichloride, diphenylmethylene(2,3,5-triisopropyl-1-cyclopentadienyl)(2,7-dimethyl-9-fluorenyl)zirconium dichloride, diphenylmethylene(3,4,5-triisopropyl-1-cyclopentadienyl)(2,7-dimethyl-9-fluorenyl)zirconium dichloride, diphenylmethylene(2,3,4,5-tetraisopropyl-1-cyclopentadienyl)(2,7-dimethyl-9-fluorenyl)zirconium dichloride, diphenylmethylene(2-phenyl-1-cyclopentadienyl)(2,7-dimethyl-9-fluorenyl)zirconium dichloride, diphenylmethylene (3-phenyl-1-cyclopentadienyl)(2,7-dimethyl-9-fluorenyl)zirconium dichloride, diphenylmethylene(2,4-diphenyl-1-cyclopentadienyl)(2,7-dimethyl-9-fluorenyl)zirconium dichloride, diphenylmethylene(2,5-diphenyl-1-cyclopentadienyl)(2,7-dimethyl-9-fluorenyl)zirconium dichloride, diphenylmethylene(3,4-diphenyl-1-cyclopentadienyl)(2,7-dimethyl-9-fluorenyl)zirconium dichloride, diphenylmethylene(2,3,4-triphenyl-1-cyclopentadienyl)(2,7-dimethyl-9-fluorenyl)zirconium dichloride, diphenylmethylene(2,3,5-triphenyl-1-cyclopentadienyl)(2,7-dimethyl-9-fluorenyl)zirconium dichloride, diphenylmethylene(3,4,5-triphenyl-1-cyclopentadienyl)(2,7-dimethyl-9-fluorenyl)zirconium dichloride, diphenylmethylene(2,3,4,5-tetraphenyl-1-cyclopentadienyl)(2,7-dimethyl-9-fluorenyl)zirconium dichloride, diphenylmethylene (2-trimethylsilyl-1-cyclopentadienyl)(2,7-dimethyl-9-fluorenyl)zirconium dichloride, diphenylmethylene (3-trimethylsilyl-1-cyclopentadienyl)(2,7-dimethyl-9-fluorenyl)zirconium dichloride, diphenylmethylene (2,4-bis(trimethylsilyl)-1-cyclopentadienyl)(2,7-dimethyl-9-fluorenyl)zirconium dichloride, diphenylmethylene(2,5-bis(trimethylsilyl)-1-cyclopentadienyl)(2,7-dimethyl-9-fluorenyl)zirconium dichloride, diphenylmethylene(3,4-bis(trimethylsilyl)-1-cyclopentadienyl)(2,7-dimethyl-9-fluorenyl)zirconium dichloride, diphenylmethylene(2,3,4-tris(trimethylsilyl)-1-cyclopentadienyl)(2,7-dimethyl-9-fluorenyl)zirconium dichloride, diphenylmethylene (2,3,5-tris(trimethylsilyl)-1-cyclopentadienyl)(2,7-dimethyl-9-fluorenyl)zirconium dichloride, diphenylmethylene(3,4,5-tris(trimethylsilyl)-1-cyclopentadienyl)(2,7-dimethyl-9-fluorenyl)zirconium dichloride, diphenylmethylene(2,3,4,5-tetrakis(trimethylsilyl)-1-cyclopentadienyl)(2,7-dimethyl-9-fluorenyl)zirconium dichloride, diphenylmethylene(1-cyclopentadienyl)(2,7-diethyl-9-fluorenyl)zirconium dichloride, diphenylmethylene(2-methyl-1-cyclopentadienyl)(2,7-diethyl-9-fluorenyl)zirconium dichloride, diphenylmethylene(3-methyl-1-cyclopentadienyl)(2,7-diethyl-9-fluorenyl)zirconium dichloride, diphenylmethylene(2,4-dimethyl-1-cyclopentadienyl)(2,7-diethyl-9-fluorenyl)zirconium dichloride, diphenylmethylene(2,5-dimethyl-1-cyclopentadienyl)(2,7-diethyl-9-fluorenyl)zirconium dichloride, diphenylmethylene(3,4-dimethyl-1-cyclopentadienyl)(2,7-diethyl-9-fluorenyl)zirconium dichloride, diphenylmethylene(2,3,4-trimethyl-1-cyclopentadienyl)(2,7-diethyl-9-fluorenyl)zirconium dichloride, diphenylmethylene (2,3,5-trimethyl-1-cyclopentadienyl)(2,7-diethyl-9-fluorenyl)zirconium dichloride, diphenylmethylene(3,4,5-trimethyl-1-cyclopentadienyl)(2,7-diethyl-9-fluorenyl)zirconium dichloride, diphenylmethylene(2,3,4,5-tetramethyl-1-cyclopentadienyl)(2,7-diethyl-9-fluorenyl)zirconium dichloride, diphenylmethylene(2-ethyl-1-cyclopentadienyl)(2,7-diethyl-9-fluorenyl)zirconium dichloride, diphenylmethylene(3-ethyl-1-cyclopentadienyl)(2,7-diethyl-9-fluorenyl)zirconium dichloride, diphenylmethylene(2,4-diethyl-1-cyclopentadienyl)(2,7-diethyl-9-fluorenyl)zirconium dichloride, diphenylmethylene(2,5-diethyl-1-cyclopentadienyl)(2,7-diethyl-9-fluorenyl)zirconium dichloride, diphenylmethylene(3,4-diethyl-1-cyclopentadienyl)(2,7-diethyl-9-fluorenyl)zirconium dichloride, diphenylmethylene (2,3,4-triethyl-1-cyclopentadienyl)(2,7-diethyl-9-fluorenyl)zirconium dichloride, diphenylmethylene(2,3,5-triethyl-1-cyclopentadienyl)(2,7-diethyl-9-fluorenyl)zirconium dichloride, diphenylmethylene (3,4,5-triethyl-1-cyclopentadienyl)(2,7-diethyl-9-fluorenyl)zirconium dichloride, diphenylmethylene(2,3,4,5-tetraethyl-1-cyclopentadienyl)(2,7-diethyl-9-fluorenyl)zirconium dichloride, diphenylmethylene(2-n-propyl-1-cyclopentadienyl)(2,7-diethyl-9-fluorenyl)zirconium dichloride, diphenylmethylene(3-n-propyl-1-cyclopentadienyl)(2,7-diethyl-9-fluorenyl)zirconium dichloride, diphenylmethylene(2,4-di-n-propyl-1-cyclopentadienyl)(2,7-diethyl-9-fluorenyl)zirconium dichloride, diphenylmethylene(2,5-di-n-propyl-1-cyclopentadienyl)(2,7-diethyl-9-fluorenyl)zirconium dichloride, diphenylmethylene(3,4-di-n-propyl-1-cyclopentadienyl)(2,7-diethyl-9-fluorenyl)zirconium dichloride, diphenylmethylene(2,3,4-tri-n-propyl-1-cyclopentadienyl)(2,7-diethyl-9-fluorenyl)zirconium dichloride, diphenylmethylene(2,3,5-tri-n-propyl-1-cyclopentadienyl)(2,7-diethyl-9-fluorenyl)zirconium dichloride, diphenylmethylene (3,4,5-tri-n-propyl-1-cyclopentadienyl)(2,7-diethyl-9-fluorenyl)zirconium dichloride, diphenylmethylene(2,3,4,5-tetra-n-propyl-1-cyclopentadienyl)(2,7-diethyl-9-fluorenyl)zirconium dichloride, diphenylmethylene(2-isopropyl-1-cyclopentadienyl)(2,7-diethyl-9-fluorenyl)zirconium dichloride, diphenylmethylene(3-isopropyl-1-cyclopentadienyl)(2,7-diethyl-9-fluorenyl)zirconium dichloride, diphenylmethylene(2,4-diisopropyl-1-cyclopentadienyl)(2,7-diethyl-9-fluorenyl)zirconium dichloride, diphenylmethylene (2,5-diisopropyl-1-cyclopentadienyl)(2,7-diethyl-9-fluorenyl)zirconium dichloride, diphenylmethylene(3,4-diisopropyl-1-cyclopentadienyl)(2,7-diethyl-9-fluorenyl)zirconium dichloride, diphenylmethylene(2,3,4-triisopropyl-1-cyclopentadienyl)(2,7-diethyl-9-fluorenyl)zirconium dichloride, diphenylmethylene(2,3,5-triisopropyl-1-cyclopentadienyl)(2,7-diethyl-9-fluorenyl)zirconium dichloride, diphenylmethylene(3,4,5-triisopropyl-1-cyclopentadienyl)(2,7-diethyl-9-fluorenyl)zirconium dichloride, diphenylmethylene(2,3,4,5-tetraisopropyl-1-cyclopentadienyl)(2,7-diethyl-9-fluorenyl)zirconium dichloride, diphenylmethylene (2-phenyl-1-cyclopentadienyl)(2,7-diethyl-9-fluorenyl)zirconium dichloride, diphenylmethylene(3-phenyl-1-cyclopentadienyl)(2,7-diethyl-9-fluorenyl)zirconium dichloride, diphenylmethylene(2,4-diphenyl-1-cyclopentadienyl)(2,7-diethyl-9-fluorenyl)zirconium dichloride, diphenylmethylene(2,5-diphenyl-1-cyclopentadienyl)(2,7-diethyl-9-fluorenyl)zirconium dichloride, diphenylmethylene (3,4-diphenyl-1-cyclopentadienyl)(2,7-diethyl-9-fluorenyl)zirconium dichloride, diphenylmethylene(2,3,4-triphenyl-1-cyclopentadienyl)(2,7-diethyl-9-fluorenyl)zirconium dichloride, diphenylmethylene(2,3,5-triphenyl-1-cyclopentadienyl)(2,7-diethyl-9-fluorenyl)zirconium dichloride, diphenylmethylene(3,4,5-triphenyl-1-cyclopentadienyl)(2,7-diethyl-9-fluorenyl)zirconium dichloride, diphenylmethylene(2,3,4,5-tetraphenyl-1-cyclopentadienyl)(2,7-diethyl-9-fluorenyl)zirconium dichloride, diphenylmethylene(2-trimethylsilyl-1-cyclopentadienyl)(2,7-diethyl-9-fluorenyl)zirconium dichloride, diphenylmethylene(3-trimethylsilyl-1-cyclopentadienyl)(2,7-diethyl-9-fluorenyl)zirconium dichloride, diphenylmethylene(2,4-bis(trimethylsilyl)-1-cyclopentadienyl)(2,7-diethyl-9-fluorenyl)zirconium dichloride, diphenylmethylene(2,5-bis(trimethylsilyl)-1-cyclopentadienyl)(2,7-diethyl-9-fluorenyl)zirconium dichloride, diphenylmethylene(3,4-bis(trimethylsilyl)-1-cyclopentadienyl)(2,7-diethyl-9-fluorenyl)zirconium dichloride, diphenylmethylene(2,3,4-tris(trimethylsilyl)-1-cyclopentadienyl)(2,7-diethyl-9-fluorenyl)zirconium dichloride, diphenylmethylene(2,3,5-tris(trimethylsilyl)-1-cyclopentadienyl)(2,7-diethyl-9-fluorenyl)zirconium dichloride, diphenylmethylene(3,4,5-tris(trimethylsilyl)-1-cyclopentadienyl)(2,7-diethyl-9-fluorenyl)zirconium dichloride, diphenylmethylene(2,3,4,5-tetrakis(trimethylsilyl)-1-cyclopentadienyl)(2,7-diethyl-9-fluorenyl)zirconium dichloride, diphenylmethylene(1-cyclopentadienyl)(2,7-di-t-butyl-9-fluorenyl)zirconium dichloride, diphenylmethylene(2-methyl-1-cyclopentadienyl)(2,7-di-t-butyl-9-fluorenyl)zirconium dichloride, diphenylmethylene(3-methyl-1-cyclopentadienyl)(2,7-di-t-butyl-9-fluorenyl)zirconium dichloride, diphenylmethylene(2,4-dimethyl-1-cyclopentadienyl)(2,7-di-t-butyl-9-fluorenyl)zirconium dichloride, diphenylmethylene(2,5-dimethyl-1-cyclopentadienyl)(2,7-di-t-butyl-9-fluorenyl)zirconium dichloride, diphenylmethylene(3,4-dimethyl-1-cyclopentadienyl)(2,7-di-t-butyl-9-fluorenyl)zirconium dichloride, diphenylmethylene(2,3,4-trimethyl-1-cyclopentadienyl)(2,7-di-t-butyl-9-fluorenyl)zirconium dichloride, diphenylmethylene(2,3,5-trimethyl-1-cyclopentadienyl)(2,7-di-t-butyl-9-fluorenyl)zirconium dichloride, diphenylmethylene(3,4,5-trimethyl-1-cyclopentadienyl)(2,7-di-t-butyl-9-fluorenyl)zirconium dichloride, diphenylmethylene(2,3,4,5-tetramethyl-1-cyclopentadienyl)(2,7-di-t-butyl-9-fluorenyl)zirconium dichloride, diphenylmethylene(2-ethyl-1-cyclopentadienyl)(2,7-di-t-butyl-9-fluorenyl)zirconium dichloride, diphenylmethylene(3-ethyl-1-cyclopentadienyl)(2,7-di-t-butyl-9-fluorenyl)zirconium dichloride, diphenylmethylene(2,4-diethyl-1-cyclopentadienyl)(2,7-di-t-butyl-9-fluorenyl)zirconium dichloride, diphenylmethylene(2,5-diethyl-1-cyclopentadienyl)(2,7-di-t-butyl-9-fluorenyl)zirconium dichloride, diphenylmethylene(3,4-diethyl-1-cyclopentadienyl)(2,7-di-t-butyl-9-fluorenyl)zirconium dichloride, diphenylmethylene(2,3,4-triehyl-1-cyclopentadienyl)(2,7-di-t-butyl-9-fluorenyl)zirconium dichloride, diphenylmethylene(2,3,5-triethyl-1-cyclopentadienyl)(2,7-di-t-butyl-9-fluorenyl)zirconium dichloride, diphenylmethylene(3,4,5-triethyl-1-cyclopentadienyl)(2,7-di-t-butyl-9-fluorenyl)zirconium dichloride, diphenylmethylene(2,3,4,5-tetraethyl-1-cyclopentadienyl)(2,7-di-t-butyl-9-fluorenyl)zirconium dichloride, diphenylmethylene(2-n-propyl-1-cyclopentadienyl)(2,7-di-t-butyl-9-fluorenyl)zirconium dichloride, diphenylmethylene(3-n-propyl-1-cyclopentadienyl)(2,7-di-t-butyl-9-fluorenyl)zirconium dichloride, diphenylmethylene(2,4-di-n-propyl-1-cyclopentadienyl)(2,7-di-t-butyl-9-fluorenyl)zirconium dichloride, diphenylmethylene(2,5-di-n-propyl-1-cyclopentadienyl)(2,7-di-t-butyl-9-fluorenyl)zirconium dichloride, diphenylmethylene(3,4-di-n-propyl-1-cyclopentadienyl)(2,7-di-t-butyl-9-fluorenyl)zirconium dichloride, diphenylmethylene(2,3,4-tri-n-propyl-1-cyclopentadienyl)(2,7-di-t-butyl-9-fluorenyl)zirconium dichloride, diphenylmethylene(2,3,5-tri-n-propyl-1-cyclopentadienyl)(2,7-di-t-butyl-9-fluorenyl)zirconium dichloride, diphenylmethylene(3,4,5-tri-n-propyl-1-cyclopentadienyl)(2,7-di-t-butyl-9-fluorenyl)zirconium dichloride, diphenylmethylene(2,3,4,5-tetra-n-propyl-1-cyclopentadienyl)(2,7-di-t-butyl-9-fluorenyl)zirconium dichloride, diphenylmethylene(2-isopropyl-1-cyclopentadienyl)(2,7-di-t-butyl-9-fluorenyl)zirconium dichloride, diphenylmethylene(3-isopropyl-1-cyclopentadienyl)(2,7-di-t-butyl-9-fluorenyl)zirconium dichloride, diphenylmethylene(2,4-diisopropyl-1-cyclopentadienyl)(2,7-di-t-butyl-9-fluorenyl)zirconium dichloride, diphenylmethylene(2,5-diisopropyl-1-cyclopentadienyl)(2,7-di-t-butyl-9-fluorenyl)zirconium dichloride, diphenylmethylene(3,4-diisopropyl-1-cyclopentadienyl)(2,7-di-t-butyl-9-fluorenyl)zirconium dichloride, diphenylmethylene(2,3,4-triisopropyl-1-cyclopentadienyl)(2,7-di-t-butyl-9-fluorenyl)zirconium dichloride, diphenylmethylene(2,3,5-triisopropyl-1-cyclopentadienyl)(2,7-di-t-butyl-9-fluorenyl)zirconium dichloride, diphenylmethylene(3,4,5-triisopropyl-1-cyclopentadienyl)(2,7-di-t-butyl-9-fluorenyl)zirconium dichloride, diphenylmethylene(2,3,4,5-tetraisopropyl-1-cyclopentadienyl)(2,7-di-t-butyl-9-fluorenyl)zirconium dichloride, diphenylmethylene(2-phenyl-1-cyclopentadienyl)(2,7-di-t-butyl-9-fluorenyl)zirconium dichloride, diphenylmethylene(3-phenyl-1-cyclopentadienyl)(2,7-di-t-butyl-9-fluorenyl)zirconium dichloride, diphenylmethylene(2,4-diphenyl-1-cyclopentadienyl)(2,7-di-t-butyl-9-fluorenyl)zirconium dichloride, diphenylmethylene(2,5-diphenyl-1-cyclopentadienyl)(2,7-di-t-butyl-9-fluorenyl)zirconium dichloride, diphenylmethylene(3,4-diphenyl-1-cyclopentadienyl)(2,7-di-t-butyl-9-fluorenyl)zirconium dichloride, diphenylmethylene(2,3,4-triphenyl-1-cyclopentadienyl)(2,7-di-t-butyl-9-fluorenyl)zirconium dichloride, diphenylmethylene(2,3,5-triphenyl-1-cyclopentadienyl)(2,7-di-t-butyl-9-fluorenyl)zirconium dichloride, diphenylmethylene(3,4,5-triphenyl-1-cyclopentadienyl)(2,7-di-t-butyl-9-fluorenyl)zirconium dichloride, diphenylmethylene(2,3,4,5-tetraphenyl-1-cyclopentadienyl)(2,7-di-t-butyl-9-fluorenyl)zirconium dichloride, diphenylmethylene(2-trimethylsilyl-1-cyclopentadienyl)(2,7-di-t-butyl-9-fluorenyl)zirconium dichloride, diphenylmethylene(3-trimethylsilyl-1-cyclopentadienyl)(2,7-di-t-butyl-9-fluorenyl)zirconium dichloride, diphenylmethylene(2,4-bis(trimethylsilyl)-1-cyclopentadienyl)(2,7-di-t-butyl-9-fluorenyl)zirconium dichloride, diphenylmethylene(2,5-bis(trimethylsilyl)-1-cyclopentadienyl)(2,7-di-t-butyl-9-fluorenyl)zirconium dichloride, diphenylmethylene(3,4-bis(trimethylsilyl)-1-cyclopentadienyl)(2,7-di-t-butyl-9-fluorenyl)zirconium dichloride, diphenylmethylene(2,3,4-tris(trimethylsilyl)-1-cyclopentadienyl)(2,7-di-t-butyl-9-fluoreneyl)zirconium dichloride, diphenylmethylene(2,3,5-tris(trimethylsilyl)-1-cyclopentadienyl)(2,7-di-t-butyl-9-fluorenyl)zirconium dichloride, diphenylmethylene(3,4,5-tris(trimethylsilyl)-1-cyclopentadienyl)(2,7-di-t-butyl-9-fluoreneyl)zirconium dichloride, diphenylmethylene(2,3,4,5-tetrakis(trimethylsilyl)-1-cyclopentadienyl)(2,7-di-t-butyl-9-fluoreneyl)zirconium dichloride, etc.

Examples include compounds in which dichloride of $X^2$ of the transition metal compound is changed with difluoride, dibromide, diiodide, dimethyl, diethyl, diisopropyl, dimethoxide, diethoxide, dipropoxide, dibutoxide, bis(trifluoromethoxide), diphenyl, diphenoxide, bis(2,6-di-tert-butylphenoxide), bis(3,4,5-trifluorophenoxide), bis(pentafluorophenoxide), bis(2,3,5,6-tetrafluoro-4-pentafluorophenylphenoxide), dibenzyl, etc. In addition, examples include compounds in which a diphenylmethylene group of the crosslinking group $[-(J^2(R^5)_2)_n-]$ of the transition metal compound is changed with a methylene group, an ethylene group, an isopropylidene group, a methylphenylmethylene group, a dimethylsilanediyl group, a diphenylsilanediyl group, a silacyclobutanediyl group, a silacyclohexanediyl group, etc. Further, examples include compounds in which zirconium of $M^2$ of the transition metal compound is changed with titanium or hafnium.

The transition metal compound of the component (A2) represented by the general formula (2) is preferably diphenylmethylene(1-cyclopentadienyl)(9-fluoreneyl)zirconium dichloride.

$M^3$ in the general formula (3) is a lithium atom, a sodium atom, a potassium atom, a rubidium atom, a Cesium atom, a beryllium atom, a magnesium atom, a calcium atom, a strontium atom, a barium atom, a zinc atom, a germanium atom, a tin atom, a lead atom, an antimony atom, or a bismuth atom. $M^3$ is preferably a magnesium atom, a calcium atom, a strontium atom, a barium atom, a zinc atom, a germanium atom, a tin atom, or a bismuth atom, more preferably a magnesium atom, a zinc atom, a tin atom, or a bismuth atom, and further preferably a zinc atom.

x in the general formula (3) represents a number corresponding to the valence of $M^3$. For example, when $M^3$ is a zinc atom, x is 2.

L in the general formula (3) represents a hydrogen atom, a halogen atom, or an optionally substituted hydrocarbyl group having 1 to 20 carbon atoms, and when there are two or more L, they may be the same or different from one another.

Examples of the halogen atom of L include a fluorine atom, a chlorine atom, a bromine atom, an iodine atom, etc.

Examples of the optionally substituted hydrocarbyl group having 1 to 20 carbon atoms of L include an alkyl group having 1 to 20 carbon atoms, an aralkyl group having 7 to 20 carbon atoms, an aryl group having 6 to 20 carbon atoms, a halogenated alkyl group having 1 to 20 carbon atoms, etc.

Examples of the alkyl group having 1 to 20 carbon atoms of L include a methyl group, an ethyl group, a n-propyl group, an isopropyl group, a n-butyl group, a sec-butyl group, a tert-butyl group, a n-pentyl group, a neopentyl group, an isopentyl group, a n-hexyl group, a n-heptyl group, a n-octyl group, a n-decyl group, a n-nonyl group, a n-decyl group, a n-dodecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-eicosyl group, etc. It is preferably a methyl group, an ethyl group, an isopropyl group, a tert-butyl group, or an isobutyl group.

Examples of the halogenated alkyl group having 1 to 20 carbon atoms of L include a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group, a diiodomethyl group, a triiodomethyl group, a fluoroethyl group, a difluoroethyl group, a trifluoroethyl group, a tetrafluoroethyl group, a pentafluoroethyl group, a chloroethyl group, a dichloroethyl group, a trichloroethyl group, a tetrachloroethyl group, a pentachloroethyl group, a bromoethyl group, a dibromoethyl group, a tribromoethyl group, a tetrabromoethyl group, a pentabromoethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a perchloropropyl group, a perchlorobutyl group, a perchloropentyl group, a perchlorohexyl group, a perchlorooctyl group, a perchlorododecyl group, a perchloropentadecyl group, a perchloroeicosyl group, a perbromopropyl group, a perbromobutyl group, a perbromopentyl group, a perbromohexyl group, a perbromooctyl group, a perbromododecyl group, a perbromopentadecyl group, a perbromoeicosyl group, etc.

Examples of the aralkyl group having 7 to 20 carbon atoms of L include a benzyl group, a (2-methylphenyl)methyl group, a (3-methylphenyl)methyl group, a (4-methylphenyl) methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (4,6-dimethylphenyl) methyl group, a (2,3,4-trimethylphenyl)methyl group, a (2,3,5-trimethylphenyl)methyl group, a (2,3,6-trimethylphenyl) methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl) methyl group, an (ethylphenyl)methyl group, a (n-propylphenyl)methyl group, an (isopropylphenyl)methyl group, a (n-butylphenyl)methyl group, a (sec-butylphenyl) methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-decylphenyl)methyl group, a (n-tetradecylphenyl)methyl group, a naphthylmethyl group, an anthracenylmethyl group, a phenylethyl group, a phenylpropyl group, a phenylbutyl group, a diphenylmethyl group, a diphenylethyl group, a diphenylpropyl group, a diphenylbutyl group, etc. It is preferably a benzyl group. In addition, examples include halogenated aralkyl groups having 7 to 20 carbon atoms in which these aralkyl groups are substituted with a halogen atom such as a fluorine atom, a chlorine atom, a bromine atom, or an iodine atom.

Examples of the aryl group having 6 to 20 carbon atoms of L include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a diethylphenyl group, a triethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl group, etc. It is preferably a phenyl group. In addition, examples include halogenated aryl groups having 6 to 20 carbon atoms in which these aryl groups are substituted with a halogen atom such as a fluorine atom, a chlorine atom, a bromine atom, or an iodine atom.

L is preferably a hydrogen atom, an alkyl group having 1 to 20 carbon atoms, or an aryl group having 6 to 20 carbon atoms, more preferably a hydrogen atom or an alkyl group having 1 to 20 carbon atoms, further preferably an alkyl group having 1 to 20 carbon atoms.

$T^1$ in the general formula (4) is an oxygen atom, a sulfur atom, a nitrogen atom, or a phosphorus atom, preferably a nitrogen atom or an oxygen atom, more preferably an oxygen atom.

Further, t in the general formula (4) represents the valence of $T^1$, and when $T^1$ is an oxygen atom or a sulfur atom, t is 2, and when $T^1$ is a nitrogen atom or a phosphorus atom, t is 3.

$R^6$ in the general formula (4) represents a halogen atom, an electron-withdrawing group, a halogen atom-containing group, or a group having an electron-withdrawing group, and represents an electron-withdrawing group-containing group or an electron-withdrawing group, and when there are two or more $R^6$, they may be the same or different from one another. As an index of electron-withdrawing property, a substituent constant σ, etc., of the Hammett equation are known, and as an electron-withdrawing group, a functional group in which a substituent constant σ of the Hammett equation is positive is exemplified.

Examples of the halogen atom of $R^6$ include a fluorine atom, a chlorine atom, a bromine atom, and an iodine atom.

Examples of the electron-withdrawing group of $R^6$ include a cyano group, a nitro group, a carbonyl group, a hydrocarbyloxycarbonyl group, a sulfone group, a phenyl group etc.

Examples of the halogen atom-containing group of $R^6$ include a halogenated hydrocarbyl group having 1 to 20 carbon atoms such as a halogenated alkyl group having 1 to 20 carbon atoms, a halogenated aralkyl group having 7 to 20 carbon atoms, a halogenated aryl group having 6 to 20 carbon atoms, a (halogenated alkyl)aryl group having 7 to 20 carbon atoms; a halogenated hydrocarbyloxy group having 1 to 20 carbon atoms; a halogenated hydrocarbyloxycarbonyl group having 2 to 20 carbon atoms. In addition, examples of the group having an electron-withdrawing group of $R^6$ include a cyanized hydrocarbyl group having 1 to 20 carbon atoms such as a cyanized aryl group having 6 to 20 carbon atoms, a nitrated hydrocarbyl group having 1 to 20 carbon atoms such as a nitrated aryl group having 6 to 20 carbon atoms, etc.

Examples of the halogenated alkyl group having 1 to 20 carbon atoms of $R^6$ include a fluoromethyl group, a chloromethyl group, a bromomethyl group, an iodomethyl group, a difluoromethyl group, a dichloromethyl group, a dibromomethyl group, a diiodomethyl group, a trifluoromethyl group, a trichloromethyl group, a tribromomethyl group, a triiodomethyl group, a 2,2,2-trifluoroethyl group, a 2,2,2-trichloroethyl group, a 2,2,2-tribromoethyl group, a 2,2,2-triiodoethyl group, a 2,2,3,3,3-pentafluoropropyl group, a 2,2,3,3,3-pentachloropropyl group, a 2,2,3,3,3-pentabromopropyl group, a 2,2,3,3,3-pentaiodopropyl group, a 2,2,2-trifluoro-1-trifluoromethylethyl group, a 2,2,2-trichloro-1-trichloromethylethyl group, a 2,2,2-tribromo-1-tribromomethylethyl group, a 2,2,2-triiodo-1-triiodomethylethyl group, a 1,1-bis(trifluoromethyl)-2,2,2-trifluoroethyl group, a 1,1-bis(trichloromethyl)-2,2,2-trichloroethyl group, a 1,1-bis(tribromomethyl)-2,2,2-tribromoethyl group, a 1,1-bis(triiodomethyl)-2,2,2-triiodoethyl group, etc.

Examples of the halogenated aryl group having 6 to 20 carbon atoms of $R^6$ include a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphthyl group, a perfluoro-2-naphthyl group, a 2-chlorophenyl group, a 3-chlorophenyl group, a 4-chlorophenyl group, a 2,4-dichlorophenyl group, a 2,6-dichlorophenyl group, a 3,4-dichlorophenyl group, a 3,5-dichlorophenyl group, a 2,4,6-trichlorophenyl group, a 3,4,5-trichlorophenyl group, a 2,3,5,6-tetrachlorophenyl group, a pentachlorophenyl group, a 2,3,5,6-tetrachloro-4-trichloromethylphenyl group, a 2,3,5,6-tetrachloro-4-pentachlorophenylphenyl group, a perchloro-1-naphthyl group, a perchloro-2-naphthyl group, a 2-bromophenyl group, a 3-bromophenyl group, a 4-bromophenyl group, a 2,4-dibromophenyl group, a 2,6-dibromophenyl group, a 3,4-dibromophenyl group, a 3,5-dibromophenyl group, a 2,4,6-tribromophenyl group, a 3,4,5-tribromophenyl group, a 2,3,5,6-tetrabromophenyl group, a pentabromophenyl group, a 2,3,5,6-tetrabromo-4-tribromomethylphenyl group, a 2,3,5,6-tetrabromo-4-pentabromophenylphenyl group, a perbromo-1-naphthyl group, a perbromo-2-naphthyl group, a 2-iodophenyl group, a 3-iodophenyl group, a 4-iodophenyl group, a 2,4-diiodophenyl group, a 2,6-diiodophenyl group, a 3,4-diiodophenyl group, a 3,5-diiodophenyl group, a 2,4,6-triiodophenyl group, a 3,4,5-triiodophenyl group, a 2,3,5,6-tetraiodophenyl group, a pentaiodophenyl group, a 2,3,5,6-tetraiodo-4-triiodomethylphenyl group, a 2,3,5,6-tetraiodo-4-pentaiodophenylphenyl group, a periodo-1-naphthyl group, a periodo-2-naphthyl group, etc.

Examples of the (halogenated alkyl)aryl group having 7 to 20 carbon atoms of $R^6$ include a 2-(trifluoromethyl)phenyl group, a 3-(trifluoromethyl)phenyl group, a 4-(trifluoromethyl)phenyl group, a 2,6-bis(trifluoromethyl)phenyl group, a 3,5-bis(trifluoromethyl)phenyl group, a 2,4,6-tris(trifluoromethyl)phenyl group, a 3,4,5-tris(trifluoromethyl)phenyl group, etc.

Examples of the cyanized aryl group having 6 to 20 carbon atoms of $R^6$ include a 2-cyanophenyl group, a 3-cyanophenyl group, a 4-cyanophenyl group, etc.

Examples of the nitrated aryl group having 6 to 20 carbon atoms of $R^6$ include a 2-nitrophenyl group, a 3-nitrophenyl group, a 4-nitrophenyl group, etc.

Examples of the hydrocarbyloxycarbonyl group having 2 to 20 carbon atoms of $R^6$ include an alkoxycarbonyl group, an aralkyloxycarbonyl group, an aryloxycarbonyl group, etc., more specifically, examples include a methoxycarbonyl group, an ethoxycarbonyl group, a n-propoxycarbonyl group, an isopropoxycarbonyl group, a phenoxycarbonyl group, etc.

Examples of the halogenated hydrocarbyloxycarbonyl group having 2 to 20 carbon atoms of $R^6$ include a halogenated alkoxycarbonyl group, a halogenated aralkyloxycarbonyl group, a halogenated aryloxycarbonyl group, etc., more specifically, examples include a trifluoromethoxycarbonyl group, a pentafluorophenoxycarbonyl group, etc.

$R^6$ is preferably a halogenated hydrocarbyl group having 1 to 20 carbon atoms, more preferably a halogenated alkyl group having 1 to 20 carbon atoms or a halogenated aryl group having 6 to 20 carbon atoms, further preferably a fluorinated alkyl group having 1 to 20 carbon atoms, a fluorinated aryl group having 7 to 20 carbon atoms, a chlorinated alkyl group having 1 to 20 carbon atoms, or a chlorinated aryl group having 6 to 20 carbon atoms, particularly preferably a fluorinated alkyl group having 1 to 20 carbon atoms or a fluorinated aryl group having 6 to 20 carbon atoms. The fluorinated arkyl group having 1 to 20 carbon atoms is preferably a fluoromethyl group, difluoromethyl group, a trifluoromethyl group, a 2,2,2-trifluoroethyl group, a 2,2,3,3,3-pentafluoropropyl group, a 2,2,2-trifluoro-1-trifluoromethylethyl group, or a 1,1-bis(trifluoromethyl)-2,2,2-trifluoroethyl group, more preferably a trifluoromethyl group, a 2,2,2-trifluoro-1-trifluoromethylethyl group, or a 1,1-bis(trifluoromethyl)-2,2,2-trifluoroethyl group. The fluorinated aryl group having 6 to 20 carbon atoms is preferably a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphthyl group, or a perfluoro-2-naphthyl group, more preferably a 3,5-difluorophenyl group, a 3,4,5-trifluorophenyl group, or a pentafluorophenyl group. The chlorinated alkyl group having 1 to 20 carbon atoms is preferably a chloromethyl group, a dichloromethyl group, a trichloromethyl group, a 2,2,2-trichloroethyl group, a 2,2,3,3,3-pentachloropropyl group, a 2,2,2-trichloro-1-trichloromethylethyl group, or a 1,1-bis(trichloromethyl)-2,2,2-trichloroethyl group. The chlorinated aryl group having 6 to 20 carbon atoms is preferably a 4-chlorophenyl group, a 2,6-dichlorophenyl group, a 3,5-dichlorophenyl group, a 2,4,6-trichlorophenyl group, a 3,4,5-trichlorophenyl group, or a pentachlorophenyl group.

$T^2$ in the general formula (5) is an oxygen atom, a sulfur atom, a nitrogen atom, or a phosphorous atom, preferably a nitrogen atom or an oxygen atom, more preferably an oxygen atom.

Further, s in the general formula (5) represents the valence of $T^2$, and when $T^2$ is an oxygen atom or a sulfur atom, s is 2, and when $T^2$ is a nitrogen atom or a phosphorus atom, s is 3.

$R^7$ in the general formula (5) represents a hydrocarbyl group having 1 to 20 carbon atoms or a halogenated hydrocarbyl group having 1 to 20 carbon atoms. Examples of the hydrocarbyl group having 1 to 20 carbon atoms of $R^6$ include an alkyl group having 1 to 20 carbon atoms, an aralkyl group having 7 to 20 carbon atoms, an aryl group having 6 to 20 carbon atoms, etc., and groups exemplified as the alkyl group having 1 to 20 carbon atoms, the aralkyl group having 7 to 20 carbon atoms, and the aryl group having 6 to 20 carbon atoms of L can be exemplified. Examples of the halogenated hydrocarbyl group having 1 to 20 carbon atoms of $R^6$ include a halogenated hydrocarbyl group having 1 to 20 carbon atoms such as a halogenated alkyl group having 1 to 20 carbon atoms, a halogenated aralkyl group having 7 to 20 carbon atoms, a halogenated aryl group having 6 to 20 carbon atoms, or a (halogenated alkyl)aryl group having 7 to 20 carbon atoms, etc., and groups exemplified as the halogenated alkyl group having 1 to 20 carbon atoms, the halogenated aryl group having 6 to 20 carbon atoms, and the (halogenated alkyl)aryl group having 7 to 20 carbon atoms of $R^5$ can be exemplified.

$R^7$ is preferably a halogenated hydrocarbyl group having 1 to 20 carbon atoms, more preferably a fluorinated hydrocarbyl group having 1 to 20 carbon atoms.

Examples of the compound represented by the general formula (3) of the component (b1), wherein $M^3$ is a zinc atom, include dialkylzinc such as dimethylzinc, diethylzinc, di-n-propylzinc, diisopropylzinc, di-n-butylzinc, diisobutylzinc, and di-n-hexylzinc; diarylzinc such as diphenylzinc, dinaphthylzinc, and bis(pentafluorophenyl)zinc; dialkenyizinc such as diallylzinc; bis(cyclopentadienyl)zinc; halogenated alkylzinc such as methylzinc chloride, ethylzinc chloride, n-propylzinc chloride, isopropylzinc chloride, n-butylzinc chloride, isobutylzinc chloride, n-hexylzinc chloride, methylzinc bromide, ethylzinc bromide, n-propylzinc bromide, isopropylzinc bromide, n-butylzinc bromide, isobutylzinc bromide, n-hexylzinc bromide, methylzinc iodide, ethylzinc iodide, n-propylzinc iodide, isopropylzinc iodide, n-butylzinc iodide, isobutylzinc iodide, and n-hexylzinc iodide; halogenated zinc such as zinc fluoride, zinc chloride, zinc bromide, and zinc iodide; etc.

The compound represented by the general formula (3) of the compound (b1) is preferably dialkylzinc, further preferably dimethylzinc, diethylzinc, di-n-propylzinc, diisopropylzinc, di-n-butylzinc, diisobutylzinc, or di-n-hexylzinc, particularly preferably dimethylzinc or diethylzinc.

Examples of the compound represented by the general formula (4) of the component (b2) include amine, phosphine, alcohol, thiol, phenol, thiophenol, naphthol, naphthylthiol, carboxylic acid compound, etc.

Examples of the amine include di(fluoromethyl)amine, bis(difluoromethyl)amine, bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine, bis(2-fluorophenyl)amine, bis(3-fluorophenyl)amine, bis(4-fluorophenyl)amine, bis(2,6-difluorophenyl)amine, bis(3,5-difluorophenyl)amine, bis(2,4,6-trifluorophenyl)amine, bis(3,4,5-trifluorophenyl)amine, bis(pentafluorophenyl)amine, bis(2-(trifluoromethyl)phenyl)amine, bis(3-(trifluoromethyl)phenyl)amine, bis(4-(trifluoromethyl)phenyl)amine, bis(2,6-di(trifluoromethyl)phenyl)amine, bis(3,5-di(trifluoromethyl)phenyl)amine, bis(2,4,6-tri(trifluoromethyl)phenyl)amine, bis(2-cyanophenyl)amine, (3-cyanophenyl)amine, bis(4-cyanophenyl)amine, bis(2-nitrophenyl)amine, bis(3-nitrophenyl)amine, bis(4-nitrophenyl)amine, bis(1H,1H-perfluorobutyl)amine, bis(1H,1H-perfluoropentyl)amine, bis(1H,1H-perfluorohexyl)amine, bis(1H,1H-perfluorooctyl)amine, bis(1H,1H-perfluorododecyl)amine, bis(1H,1H-perfluoropentadecyl)amine, bis(1H,1H-perfluoroeicosyl)amine, etc. In addition, examples include amines in which fluoro of these amines is changed with chloro, bromo, or iodo.

Examples of the phosphine include compounds in which a nitrogen atom of the amines is changed with a phosphorus atom. Those phosphines are compounds represented by substituting amine in the amines with phosphine.

Examples of the alcohol include fluoromethanol, difluoromethanol, trifluoromethanol, 2,2,2-trifluoroethanol, 2,2,3,3,3-pentafluoropropanol, 2,2,2-trifluoro-1-trifluoromethylethanol, 1,1-bis(trifluoromethyl)-2,2,2-trifluoroethanol, 1H,1H-perfluorobutanol, 1H,1H-perfluoropentanol, 1H,1H-perfluorohexanol, 1H,1H-perfluorooctanol, 1H,1H-perfluorododecanol, 1H,1H-perfluoropentadecanol, 1H,1H-perfluoroeicosanol, etc. In addition, examples include alcohols in which fluoro of these alcohols is changed with chloro, bromo, or iodo.

Examples of the thiol include compounds in which an oxygen atom of the alcohols is changed with a sulfur atom. Those thiols are compounds represented by substituting nol in the alcohols with nthiol.

Examples of the phenol include 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 3,4,5-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol, etc. In addition, examples include phenols in which fluoro of these phenols is changed with chloro, bromo, or iodo.

Examples of the thiophenol include compounds in which an oxygen atom of the phenols is changed with a sulfur atom. Those thiophenols are compounds represented by substituting phenol in the phenols with thiophenol.

Examples of the naphthol include perfluoro-1-naphthol, perfluoro-2-naphthol, 4,5,6,7,8-pentafluoro-2-naphthol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 2-cyanophenol, 3-cyanophenol, 4-cyanophenol, 2-nitrophenol, 3-nitrophenol, 4-nitrophenol, etc. In addition, examples include naphthols in which fluoro of these naphthols is changed with chloro, bromo, or iodo.

Examples of the naphthylthiol include compounds in which an oxygen atom of the naphthols is changed with a sulfur atom. Those naphthiols are compounds represented by substituting naphthol in the naphthols with naphthylthiol.

Examples of the carboxylic acid compound include pentafluorobenzoic acid, perfluoroethanoic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, perfluoroundecanoic acid, perfluorododecanoic acid, etc.

The compound represented by the general formula (4) of the component (b2) is preferably an amine, alcohol, or phenol compound, the amine is preferably bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine, or bis(pentafluorophenyl)amine, the alcohol is preferably trifluoromethanol, 2,2,2-trifluoroethanol, 2,2,3,3,3-pentafluoropropanol, 2,2,2-trifluoro-1-trifluoromethylethanol, or 1,1-bis(trifluoromethyl)-2,2,2-trifluoroethanol, and the phenol is preferably 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, or 3,4,5-tris(trifluoromethyl)phenol.

The compound represented by the general formula (4) of the component (b2) is more preferably bis(trifluoromethyl)amine, bis(pentafluorophenyl)amine, trifluoromethanol, 2,2,2-trifluoro-1-trifluoromethylethanol, 1,1-bis(trifluoromethyl)-2,2,2-trifluoroethanol, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 4-(trifluoromethyl)phenol, 2,6-bis(trifluoromethyl)phenol, or 2,4,6-tris(trifluoromethyl)phenol, further preferably 3,5-difluorophenol, 3,4,5-trifluorophenol, pentafluorophenol, or 1,1-bis(trifluoromethyl)-2,2,2-trifluoroethanol.

Examples of the compound represented by the general formula (5) of the component (b3) include water, hydrogen sulfide, amine, aniline compound, etc.

Examples of the amine include alkylamine such as methylamine, ethylamine, n-propylamine, isopropylamine, n-butylamine, sec-butylamine, tert-butylamine, isobutylamine, n-pentylamine, neopentylamine, isopentylamine, n-hexylamine, n-octylamine, n-decylamine, n-dodecylamine, n-pentadecylamine, and n-eicosylamine; aralkylamine such as benzylamine, (2-methylphenyl)methylamine, (3-methylphenyl)methylamine, (4-methylphenyl)methylamine, (2,3-dimethylphenyl)methylamine, (2,4-dimethylphenyl)methylamine, (2,5-dimethylphenyl)methylamine, (2,6-dimethylphenyl)methylamine, (3,4-dimethylphenyl)methylamine, (3,5-dimethylphenyl)methylamine, (2,3,4-trimethylphenyl)methylamine, (2,3,5-trimethylphenyl)methylamine, (2,3,6-trimethylphenyl)methylamine, (3,4,5-trimethylphenyl)methylamine, (2,4,6-trimethylphenyl)methylamine, (2,3,4,5-tetramethylphenyl)methylamine, (2,3,4,6-tetramethylphenyl)methylamine, (2,3,5,6-tetramethylphenyl)methylamine, (pentamethylphenyl)methylamine, (ethylphenyl)methylamine, (n-propylphenyl)methylamine, (isopropylphenyl)methylamine, (n-butylphenyl)methylamine, (sec-butylphenyl)methylamine, (tert-butylphenyl)methylamine, (n-pentylphenyl)methylamine, (neopentylphenyl)methylamine, (n-hexylphenyl)methylamine, (n-octylphenyl)methylamine, (n-decylphenyl)methylamine, (n-tetradecylphenyl)methylamine, naphthylmethylamine, and anthracenylmethylamine; allylamine; cyclopentadienylamine; etc.

In addition, examples of the amine include halogenated alkylamine such as fluoromethylamine, difluoromethylamine, trifluoromethylamine, 2,2,2-trifluoroethylamine, 2,2,3,3,3-pentafluoropropylamine, 2,2,2-trifluoro-1-trifluoromethylethylamine, 1,1-bis(trifluoromethyl)-2,2,2-trifluoroethylamine, perfluoropropylamine, perfluorobutylamine, perfluoropentylamine, perfluorobutylamine, perfluorooctylamine, perfluorododecylamine, perfluoropentadecylamine, and perfluoroeicosylamine, etc. In addition, examples includes amines in which fluoro of these amines is changed with chloro, bromo, or iodo.

Examples of the aniline compound include aniline, naphthylamine, anthracenylamine, 2-methylaniline, 3-methylaniline, 4-methylaniline, 2,3-dimethylaniline, 2,4-dimethylaniline, 2,5-dimethylaniline, 2,6-dimethylaniline, 3,4-dimethylaniline, 3,5-dimethylaniline, 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, 2-ethylaniline, 3-ethylaniline, 4-ethylaniline, 2,3-diethylaniline, 2,4-diethylaniline, 2,5-diethylaniline, 2,6-diethylaniline, 3,4-diethylaniline, 3,5-diethylaniline, 2,3,4-triethylaniline, 2,3,5-triethylaniline, 2,3,6-triethylaniline, 2,4,6-triethylaniline, 3,4,5-triethylaniline, 2,3,4,5-tetraethylaniline, 2,3,4,6-tetraethylaniline, 2,3,5,6-tetraethylaniline, pentaethylaniline, etc. In addition, examples include aniline compounds in which ethyl of these aniline compounds is changed with n-propyl; isopropyl, n-butyl, sec-butyl, tert-butyl, n-pentyl, neopentyl, n-hexyl, n-octyl, n-decyl, n-dodecyl, n-tetradecyl, etc.

In addition, examples of the aniline compound include 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-di(trifluoromethyl)aniline, 3,5-di(trifluoromethyl)aniline, 2,4,6-tri(trifluoromethyl)aniline, 3,4,5-tri(trifluoromethyl)aniline, etc. In addition, examples include aniline compounds in which fluoro of these aniline compounds is changed with chloro, bromo, iodo, etc.

The compound represented by the general formula (5) of the component (b3) is preferably water, hydrogen sulfide, methylamine, ethylamine, n-propylamine, isopropylamine, n-butylamine, sec-butylamine, tart-butylamine, isobutylamine, n-octylamine, aniline, 2,6-dimethylaniline, 2,4,6-trimethylaniline, naphthylamine, anthracenylamine, benzylamine, trifluoromethylamine, pentafluoroethylamine, perfluoropropylamine, perfluorobutylamine, perfluoropentylamine, perfluorobutylamine, perfluorooctylamine, perfluorododecylamine, perfluoropentadecylamine, perfluoroeicosylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline, 2,4,6-tris(trifluoromethyl)aniline, or 3,4,5-tris(trifluoromethyl)aniline, particularly preferably water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline, 2,4,6-tris(trifluoromethyl)aniline, or 3,4,5-tris(trifluoromethyl)aniline, most preferably water or pentafluoroaniline.

The component (3) is formed by bringing the component (b1), the component (b2) and the component (b3) into contact with each other. Examples of an order of bringing the component (b1), the component (b2) and the component (b3) into contact with each other include the following orders.

[1] The component (b1) and the component (b2) are brought into contact with each other, and the contact product derived from the contact is brought into contact with the component (b3).

[2] The component (b1) and the component (b3) are brought into contact with each other, and the contact product derived from the contact is brought into contact with the component (b2)

[3] The component (b2) and the component (b3) are brought into contact with each other, and the contact product derived from the contact is brought into contact with the component (b1).

It is preferable that contact between the component (b1), the component (b2) and the component (b3) be performed under the inert gas atmosphere. A contact temperature is usually −100 to 300° C., preferably −80 to 200° C. A contact time is usually 1 minute to 200 hours, preferably 10 minutes to 100 hours. Further, a solvent may be used for contact, or these compounds may be directly brought into contact with each other without use of the solvent.

When a solvent is used, the solvent which does not react with the component (b1), the component (b2) and the component (b3), and the contact product thereof is used. However, as described above, when respective components are brought into contact with each other step-wisely, even a solvent which reacts with a certain component at a certain stage, but does not react with respective components at other stage, can be used at other stage. That is, solvents at respective stages are the same as, or different from one another. Examples of the solvent include a nonpolar solvent such as an aliphatic hydrocarbon solvent, and an aromatic hydrocarbon solvent; a polar solvent such as a halogenated solvent, an ether solvent, an alcohol solvent, a phenol solvent, a carbonyl solvent, a phosphoric acid derivative, a nitrile solvent, a nitro compound, an amine solvent, a sulfur compound, etc. Specific examples include an aliphatic hydrocarbon solvent such as butane, pentane, hexane, heptanes, octane, 2,2,4-trimethylpentane, and cyclohexane; an aromatic hydrocarbon solvent such as benzene, toluene, and xylene; a halogenated solvent such as dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene, and o-dichlorobenzene; an ether solvent such as dimethyl ether, diethyl ether, diisopropyl ether, di-n-butyl ether, methyl-tert-butyl-ether, anisole, 1,4-dioxane, 1,2-dimethoxyethane, bis(2-methoxyethyl)ether, tetrahydrofuran, and tetrahydropyran; an alcohol solvent such as methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, and glycerin; a phenol solvent such as phenol, and p-cresol; a carbonyl solvent such as acetone, ethyl methyl ketone, cyclohexanone, acetic acid anhydride, ethyl acetate, butyl acetate, ethylene carbonate, propylene carbonate, N,N-dimethylformamide, N,N-dimethylacetamide, and N-methyl-2-pyrrolidone; a phosphoric acid derivative such as hexamethylphosphoric acid triamide, and phosphoric acid triethyl; a nitrile solvent such as acetonitrile, propionitrile, succinonitrile, and benzonitrile; a nitro compound such as nitromethane, and nitrobenzene; an amine solvent such as pyridine, piperidine, and molpholine; a sulfur compound such as dimethyl sulfoxide, and sulfolane; etc.

It is preferable that use amounts of the component (b2) and the component (b3) per mole of a use amount of the component (b1) satisfy the following relation (II).

$$|\text{Valence of M}^3\text{-mole amount of component}(b2)-2\times \text{mole amount of component}(b3)|\leq 1 \quad (II)$$

Further, a use amount of the component (b2) per mole of a use amount of the component (b1) is preferably 0.01 to 1.99 mol, more preferably 0.1 to 1.8 mol, further preferably 0.2 to 1.5 mol, most preferably 0.3 to 1 mol. A preferable use amount, a more preferable use amount, a further preferable use amount, and a most preferable use amount of the component (b3) per mole of a use amount of the component (b1) are calculated by the valence of $M^3$, a use amount of the component (b2) per mole of a use amount of the component (b1), and the relation (II) respectively.

Use amounts of the component (b1) and the component (b2) are such amounts that a metal atom derived from the component (b1) contained in the component (B) is preferably 0.1 mmol or more, more preferably 0.5 to 20 mmol, expressed by the molar number of the metal atom contained per gram of the component (B).

In order to progress a reaction more rapidly, a heating step at a higher temperature may be added after the aforementioned contact. In the heating step, in order to realize a higher temperature, it is preferable to use a solvent having a high boiling point, and upon implementation of the heating step, a solvent used in contact may be substituted with other solvent having a higher boiling point.

In the component (B), as a result of such a contact, the component (b1), the component (b2) and/or the component (b3) which are a raw material may remain as an unreacted substance, but it is preferable to perform washing treatment of removing an unreacted substance in advance. A solvent thereupon may be the same as, or different from the solvent at contact. It is preferable that such a washing treatment be performed under the inert gas atmosphere. A contact temperature is usually −100 to 300° C., preferably −80 to 200° C. A contact time is usually 1 minute to 200 hours, preferably 10 minutes to 100 hours.

In addition, it is preferable that after such a contact and washing treatment, a solvent be distilled off from a product and, thereafter, drying be performed at a temperature of 0° C. or higher for 1 hour to 24 hours under reduced pressure. More preferable is 1 hour to 24 hours at temperature of 0° C. to 200° C., further preferable is 1 hour to 24 hours at a temperature of 10° C. to 200° C., particularly preferable is 2 hours to 18 hours at a temperature of 10° C. to 160° C., and most preferable is 4 hours to 18 hours at a temperature of 15° C. to 160° C.

The component (B) is preferably a solid catalyst component formed by bringing the above component (b1), the above component (b2), the above component (b3) and the following component (b4) into contact with each other.

(b4): granular carrier

As the granular carrier of the component (b4), a solid substance which is insoluble in a solvent for preparing a polymerization catalyst or a polymerization solvent is suitably used, and a porous substance is more suitably used. A role of the granular carrier is described, for example, in "Catalyst Chemistry Applied Chemistry Series 6" etc.

It is preferable that the granular carrier of the component (b4) be of a uniform particle diameter, and a geometrical standard deviation based on a volume of a particle diameter of the granular carrier of the component (b4) is preferably 2.5 or less, more preferably 2.0 or less, further preferably 1.7 or less.

An average particle diameter of the granular carrier of the component (b4) is usually 1 to 5000 μm, preferably 5 to 1000 μm, more preferably 10 to 500 μm, further preferably 10 to 100 μm. A pore volume is preferably 0.1 ml/g or more, more preferably 0.3 to 10 ml/g. A specific surface area is preferably 10 to 1000 m$^2$/g, more preferably 100 to 500 m$^2$/g.

As the porous substance of the granular carrier of the component (b4), an inorganic substance or an organic polymer is suitably used, and the inorganic substance is more suitably used.

Examples of the inorganic substance include an inorganic oxide, a clay, a clay mineral, etc. Alternatively, a plurality of them may be used by mixing them.

Examples of the inorganic oxide include $SiO_2$, $Al_2O_3$, MgO, $ZrO_2$, $TiO_2$, $B_2O_3$, CaO, ZnO, BaO, $ThO_2$, $SiO_2$—MgO, $SiO_2$—$Al_2O_3$, $SiO_2$—$TiO_2$, $SiO_2$—$V_2O_5SiO_2$—$Cr_2O_3$, $SiO_2$—$TiO_2$—MgO, as well as a mixture of two or more kinds of them. Among these inorganic oxides, $SiO_2$ and/or $Al_2O_3$ are preferable, and $SiO_2$ (silica) is particularly preferable. In addition, the inorganic oxides may contain a small amount of carbonate, sulfate, nitrate, and oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O_2K_2O$, and $Li_2O$.

Usually, a hydroxy group is produced, and it is present on a surface of the inorganic oxide. As the inorganic oxide, an improved inorganic oxide in which active hydrogen of a surface hydroxy group is substituted with a variety of substituents may be used. Examples of the improved inorganic oxide include inorganic oxides which have been brought into contact with trialkylchlorosilane such as trimethylchlorosilane, and tert-butyldimethylchlorosilane; triarylchlorosilane such as triphenylchlorosilane; dialkyldichlorosilane such as dimethyldichlorosilane; diaryldichlorosilane such as diphenyldichlorosilane; alkyltrichlorosilane such as methyltrichlorosilane; aryltrichlorosilane such as phenyltrichlorosilane; trialkylalkoxysilane such as trimethylmethoxysilane; triarylalkoxysilane such as triphenylmethoxysilane; dialkyldialkoxysilane such as dimethyldimethoxysilane; diaryldialkoxysilane such as diphenyldimethoxysilane; alkyltrialkoxysilane such as methyltrimethoxysilane; aryltrialkoxysilane such as phenyltrimethoxysilane; tetraalkoxysilane such as tetramethoxysilane; alkyldisilazane such as 1,1,1,3,3,3-hexamethyldisilazane; tetrachlorosilane; alcohol such as methanol, and ethanol; phenol; dialkylmagnesium such as dibutylmagnesium, butylethylmagnesium, and butyloctylmagnesium; alkyllithium such as butyllithium; etc., and inorganic oxides which have been contacted with dialkylamine such as diethylamine, and diphenylamine, alcohol such as methanol and ethanol, or phenol after contact with trialkylaluminum.

In the inorganic oxide, a strength of the inorganic oxide has been enhanced by hydrogen-bonding between hydroxy groups, in some cases. In that case, if all of active hydrogens of a surface hydroxy group have been substituted with a variety of substituents, this leads to reduction in a particle strength, etc., in some cases. Therefore, it is not required that all of active hydrogens of a surface hydroxy group of the inorganic oxide are necessarily substituted, and a substitution rate of a surface hydroxy group may be appropriately determined. A method of changing a substitution rate of a surface hydroxy group is not particularly limited. Examples of the method include a method of changing a use amount of a compound to be used for contact.

Examples of the clay or the clay mineral include kaolin, bentonite, kibushi clay, gairome clay, allophone, hisingerite, pyrophyllite, talc, mica group, smectite, montmorillonite group, hectorite, laponite, saponite, vermiculite, chlorite group, palygorskite, kaolinite, nacrite, dickite, and halloysite. Among them, preferable is smectite, montmorillonite, hectorite, laponite, or saponite, and further preferable is montmorillonite or hectorite.

As the inorganic substance, an inorganic oxide is suitably used. It is preferable that the inorganic substance have been dried and a moisture have been substantially removed therefrom, and the inorganic substance which has been dried by heat-treatment is preferable. Heat-treatment is usually performed on the inorganic substance in which a moisture cannot be confirmed visually, at a temperature of 100 to 1,500° C., preferably 100 to 1,000° C., further preferably 200 to 800° C. A heating time is preferably 10 minutes to 50 hours, more preferably 1 hour to 30 hours. Examples of the method of heat-drying include a method of drying by flowing a dried inert gas (e.g. nitrogen or argon) at a constant flow rate during heating, a method of heating and reducing a pressure under reduced pressure, etc.

As the organic polymer, a polymer having a functional group having active hydrogen or a non-proton donating Lewis basic functional group is preferable.

Examples of the functional group having active hydrogen include a primary amino group, a secondary amino group, an imino group, an amido group, a hydazido group, an amidino group, a hydroxy group, a hydroperoxy group, a carboxyl group, a formyl group, a carbamoyl group, a sulfonic acid group, a sulfinic acid group, a sulfenic acid group, a thiol group, a thioformyl group, a pyrrolyl group, an imidazolyl group, a piperidyl group, an indazolyl group, a carbazolyl group, etc. It is preferably a primary amino group, a secondary amino group, an imino group, an amido group, an imido group, a hydroxy group, a formyl group, a carboxyl group, a sulfonic acid group, or a thiol group. Particularly preferably a primary amino group, a secondary amino group, an amido group, or a hydroxy group. In addition, these groups may be substituted with a halogen atom or a hydrocarbyl group having 1 to 20 carbon atoms.

The non-proton donating Lewis basic functional group is a functional group having a Lewis base part not having an active hydrogen atom, and examples include a pyridyl group, a N-substituted imidazolyl group, a N-substituted indazolyl group, a nitrile group, an amido group, a N-substituted imino group, a N,N-substituted amino group, a N,N-substituted aminooxy group, a N,N,N-substituted hydrazino group, a nitroso group, a nitro group, a nitrooxy group, a furyl group, a carbonyl group, a thiocarbonyl group, an alkoxy group, an alkyloxycarbonyl group, a N,N-substituted carbamoyl group, a thioalkoxy group, a substituted sulfinyl group, a substituted sulfonyl group, a substituted sulfonic acid group, etc. It is preferably a heterocyclic group, and further preferably an aromatic heterocyclic group having an oxygen atom and/or a nitrogen atom in a ring. It is particularly preferably a pyridyl group, a N-substituted imidazolyl group, or a N-substituted indazolyl group, and most preferably a pyridyl group. In addition, these groups may be substituted with a halogen atom, or a hydrocarbyl group having 1 to 20 carbon atoms.

In the organic polymer, a content of the functional having active hydrogen or the non-proton donating Lewis basic functional group is preferably 0.01 to 50 mmol/g, more preferably 0.1 to 20 mmol/g, expressed by a mole amount of the functional group per gram of the polymer unit constituting the organic polymer.

Examples of a method for producing a polymer having the functional group having active hydrogen or the non-proton donating Lewis basic functional group include a method of homo-polymerizing a monomer having the functional group having active hydrogen or the non-proton donating Lewis basic functional group and one or more polymerizable unsaturated groups, and a method of copolymerizing the monomer and other monomer having a polymerizable unsaturated group. Thereupon, it is preferable to further copolymerize a crosslinking polymerizable monomer having two or more polymerizable unsaturated groups together.

Examples of the polymerizable unsaturated group include an alkenyl group such as a vinyl group, and an allyl group; an alkynyl group such as an ethyne group; etc.

Examples of the monomer having the functional group having active hydrogen and one or more polymerizable unsaturated groups include vinyl group-containing primary amine, vinyl group-containing secondary amine, a vinyl group-containing amide compound, a vinyl group-containing hydroxy compound, etc. Specific examples of the monomer include N-(1-ethenyl)amine, N-(2-propenyl)amine, N-(1-ethenyl)-N-methylamine, N-(2-propenyl)-N-methylamine, 1-ethenylamide, 2-propenylamide, N-methyl-(1-ethenyl)amide, N-methyl-(2-propenyl)amide, vinyl alcohol, 2-propen-1-ol, 3-buten-1-ol, etc.

Examples of the monomer having the functional group having a Lewis base part not having an active hydrogen atom and one or more polymerizable unsaturated groups include vinylpyridine, vinyl(N-substituted)imidazole, vinyl(N-substituted)indazole, etc.

Examples of other monomer having a polymerizable unsaturated group include ethylene, an α-olefin, an aromatic vinyl compound, a cyclic olefin, etc. A specific example of the monomer is ethylene, propylene, 1-butene, 1-hexene, 4-methyl-1-pentene, styrene, norbornene, or dicyclopentadiene. Two or more kinds of these monomers may be used. Preferable is ethylene or styrene. In addition, examples of the crosslinking polymerizable monomer having two or more polymerizable unsaturated groups include divinylbenzene, etc.

It is preferable that the organic polymer have been dried and a moisture have been substantially removed therefrom, and the organic polymer which has been dried by heat-treatment is preferable. Heat-treatment is usually performed on the organic polymer in which a moisture cannot be confirmed visually, at a temperature of 30 to 400° C., preferably 50 to 200° C., further preferably 70 to 150° C. A heating time is preferably 10 minutes to 50 hours, more preferably 1 hour to 30 hours. Examples of the method of heat-drying include a method of drying by flowing a dried inert gas (e.g. nitrogen or argon) at a constant flow rate during heating, a method of heat-drying under reduced pressure, etc.

When as the component (B), a solid catalyst component formed by bringing the component (b1), the component (b2), the component (b3), and the component (b4) in contact with each other is used, examples of an order of bringing the component (b1), the component (b2), the component (b3), and the component (b4) into contact with each other include the following orders.

<1> The component (b1) and the component (b2) are brought into contact with each other, the contact product derived from the contact is brought into contact with the component (b3), and the contact product derived from the contact is brought into contact with the component (b4).

<2> The component (b1) and the component (b2) are brought into contact with each other, the contact product derived from the contact is brought into contact with the component (b4), and the contact product derived from the contact is brought into contact with the component (b3).

<3> The component (b1) and the component (b3) are brought into contact with each other, the contact product derived from the contact is brought into contact with the component (b2), and the contact product derived from the contact is brought into contact with the component (b4).

<4> The component (b1) and the component (b3) are brought into contact with each other, the contact product derived from the contact is brought into contact with the component (b4), and the contact product derived from the contact is brought into contact with the component (b2).

<5> The component (b1) and the component (b4) are brought into contact with each other, the contact product derived from the contact is brought into contact with the component (b2), and the contact product derived from the contact is brought into contact with the component (b3).

<6> The component (b1) and the component (b4) are brought into contact with each other, the contact product derived from the contact is brought into contact with the component (b3), and the contact product derived from the contact is brought into contact with the component (b2).

<7> The component (b2) and the component (b3) are brought into contact with each other, the contact product derived from the contact is brought into contact with the component (b1), and the contact product derived from the contact is brought into contact with the component (b4).

<8> The component (b2) and the component (b3) are brought into contact with each other, the contact product derived from the contact is brought into contact with the component (b4), and the contact product derived from the contact is brought into contact with the component (b1).

<9> The component (b2) and the component (b4) are brought into contact with each other, the contact product derived from the contact is brought into contact with the component (b1), and the contact product derived from the contact is brought into contact with the component (b3).

<10> The component (b2) and the component (b4) are brought into contact with each other, the contact product derived from the contact is brought into contact with the component (b3), and the contact product derived from the contact is brought into contact with the component (b1).

<11> The component (b3) and the component (b4) are brought into contact with each other, the contact product derived from the contact is brought into contact with the component (b1), and the contact product derived from the contact is brought into contact with the component (b2).

<12> The component (b3) and the component (b4) are brought into contact with each other, the contact product derived from the contact is brought into contact with the component (b2), and the contact product derived from the contact is brought into contact with the component (b1).

It is preferable that contact between the component (b1), the component (b2), the component (b3), and the component (b4) be performed under the inert gas atmosphere. A contact temperature is usually −100 to 300° C., preferably −80 to 200° C. A contact time is usually 1 minute to 200 hours, preferably 10 minutes to 100 hours. In addition, a solvent may be used for contact, or these compounds may be directly brought into contact with each other without using the solvent.

When a solvent is used, the solvent which does not react with the component (b1), the component (b2), the component (b3), and the component (b4), and the contact product thereof is used. However, as described above, when respective components are brought into contact with each other step-wisely, even a solvent which reacts with a certain component at a certain stage, but does not react with respective components at other stage can be used at other stage. That is, solvents at respective stages are the same as, or different from one another. Examples of the solvent include a nonpolar solvent such as an aliphatic hydrocarbon solvent, and an aromatic hydrocarbon solvent; a polar solvent such as a halogenated solvent, an ether solvent, an alcohol solvent, a phenol solvent, a carbonyl solvent, a phosphoric acid derivative, a nitrile solvent, a nitro compound, an amine solvent, and a sulfur compound. Specific examples include an aliphatic hydrocarbon solvent such as butane, pentane, hexane, heptane, octane, 2,2,4-trimethylpentane, and cyclohexane; an aromatic hydrocarbon solvent such as benzene, toluene, and xylene; a halogenated solvent such as dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene, and an o-dichlorobenzene; an ether solvent such as dimethyl ether, diethyl ether, diisopropyl ether, di-n-butyl ether, methyl-tert-butyl-ether, anisole, 1,4-dioxane, 1,2-dimethoxyethane, bis(2-methoxyethyl) ether, tetrahydrofuran, and tetrahydropyran; an alcohol solvent such as methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, and glycerin; a phenol solvent such as phenol, and p-cresol; a carbonyl solvent such as acetone, ethyl methyl ketone, cyclohexanone, acetic acid anhydride, ethyl acetate, butyl acetate, ethyl carbonate, propylene carbonate, N,N-dimethylformamide, N,N-dimethylacetamide, and N-methyl-2-pyrrolidone; a phosphoric acid derivative such as hexamethylphosphoric acid triamide, and phosphoric acid triethyl; a nitrile solvent such as acetonitrile, propionitrile, succinonitrile, and benzonitrile; a nitro compound such as nitromethane, and nitrobenzene; an amine solvent such as pyridine, piperidine, and morpholine; and a sulfur compound such as dimethyl sulfoxide, and sulfolane.

When the contact product (c) obtained by bringing the component (b1), the component (b2) and the component (b3) into contact with each other is brought into contact with the component (b4), that is, in each method of the <1>, <3> and <7>, as a solvent (s1) to be used when the contact product (c) is produced, the aliphatic hydrocarbon solvent, the aromatic hydrocarbon solvent or the ether solvent is preferable.

On the other hand, as a solvent (s2) to be used when the contact product (c) and the component (b4) are brought into contact with each other, a polar solvent is preferable. As an index expressing polarity of the solvent, an $E_T^N$ value (C. Reichardt, "Solvents and Solvents Effects in Organic Chemistry", $2^{nd}$ ed., VCH Verlag (1988).) etc. are know, and the solvent satisfying a range of $0.8\ E_T^N \geq 0.1$ is particularly preferable.

Examples of such a polar solvent include dichloromethane, dichlorodifluoromethane, chloroform, 1,2-dichloroethane, 1,2-dibromoethane, 1,1,2-trichloro-1,2,2-trifluoroethane, tetrachloroethylene, chlorobenzene, bromobenzene, o-dichlorobenzene, dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, acetone, ethyl methyl ketone, cyclohexanone, acetic acid anhydride, ethyl acetate, butyl acetate, ethyl carbonate, propylene carbonate, N,N-dimethylformamide, N,N-dimethylacetamide, N-methyl-2-pyrrolidone, hexamethylphosphoric acid triamide, phosphoric acid triethyl, acetonitrile, propionitrile, succinonitrile, benzonitrile, nitromethane, nitrobenzene, ethylenediamine, pyridine, piperidine, morpholine, dimethyl sulfoxide, sulfolane, etc.

The solvent (s2) is further preferably dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoyethanol, 2-ethoxyethanol, diethylene glycol, or triethylene glycol, particularly preferable di-butyl ether, methyl-tert-butyl ether, 1,4-dioxane, tetrahydrofuran, methanol, ethanol, 1-propanol, 2-propanol, 1-butanol, 2-butanol, 2-methyl-1-propanol, 3-methyl-1-butanol, or cyclohexanol, most preferably tetrahydrofuran, methanol, ethanol, 1-propanol, or 2-propanol.

As the solvent (s2), a mixed solvent of these polar solvents and a hydrocarbon solvent can be used. As the hydrocarbon solvent, compounds exemplified as the aliphatic hydrocarbon solvent and the aromatic hydrocarbon solvent are used. Examples of the mixed solvent of a polar solvent and a hydrocarbon solvent include a hexane/methanol mixed solvent, a hexane/ethanol mixed solvent, a hexane/1-propanol mixed solvent, a hexane/2-propanol mixed solvent, a heptane/methanol mixed solvent, a heptane/ethanol mixed solvent, a heptane/1-propanol mixed solvent, a heptane/2-propanol mixed solvent, a toluene/methanol mixed solvent, a toluene/ethanol mixed solvent, a toluene/1-propanol Mixed solvent, a toluene/2-propanol mixed solvent, a xylene/methanol mixed solvent, a xylene/ethanol mixed solvent, a xylene/1-propanol mixed solvent, and a xylene/2-propanol mixed solvent. Preferable is a hexane/methanol mixed solvent, a hexane/ethanol mixed solvent, a heptane/methanol mixed solvent, a heptane/ethanol mixed solvent, a tolene/methanol mixed solvent, a toluene/ethanol mixed solvent, a xylene/methanol mixed solvent, or a xylene/ethanol mixed solvent. Further preferable is a hexane/methanol mixed solvent, a hexane/ethanol mixed solvent, a toluene/methanol mixed solvent, or a toluene/ethanol mixed solvent. Most preferable is a toluene/ethanol mixed solvent. In addition, a preferable range of an ethanol fraction in a toluene/ethanol mixed solvent is 10 to 50% by volume, further preferably 15 to 30% by volume.

When the contact product (c) formed by bringing the component (b1), the component (b2) and the component (b3) into contact with each other is brought into contact with the component (b4), that is, in each method of the <1>, <3> and <77, as the solvent (s1) and the solvent (s2), a hydrocarbon solvent can be also used as both solvents. In this case, a time until the resulting contact product (c) and the component (b4) are brought into contact with each other after the component (b1), the component (b2) and the component (b3) are brought into contact with each other is preferably shorter. A time is preferably 0 to 5 hours, further preferably 0 to 3 hours, most preferably 0 to 1 hour. In addition, a temperature for contacting the contact product (c) and the component (b4) is usually 100° C. to 40° C., preferably −20° C. to 20° C., most preferably 10° C. to 10° C.

In the case of the <2>, <5>, <6>, <8>, <9>, <10>, <11>, or <12>, all of the aforementioned nonpolar solvents and polar solvents can be used. Preferable is a nonpolar solvent. This is because the contact product of the component (b1) and the component (b3), or the contact product derived from contact between the contact product of the component (b1) and the component (b2), and the component (b3) has generally low solubility in a nonpolar solvent, therefore, when the component (b4) is present in a reaction system at production of these contact products, it is thought that the contact product is precipitated on a surface of the component (b4), and is more easily solidified.

In order to progress a reaction more rapidly, after the aforementioned contact, a heating step at a higher temperature may be added. In the heating step, in order to realize a higher temperature, it is preferable to use a solvent having a high boiling point and, upon implementation of the heating step, a solvent for use in contact may be substituted with other solvent having a higher boiling point.

In the component (B), as a result of such a contact, the component 091), the component (b2), the component (b3) and/or the component (b4) which are a raw material may remain as an unreacted substance, but it is preferable to perform washing treatment of removing an unreacted substance in advance. A solvent thereupon may be the same as, or different from the solvent at contact. It is preferable that such a washing treatment be performed under the inert gas atmosphere. A contact temperature is usually −100 to 300° C., preferably −80 to 200° C. A contact time is usually 1 minute to 200 hours, preferably 10 minutes to 100 hours.

In addition, it is preferable that, after such a contact and washing treatment, a solvent be distilled off from a product and, thereafter, drying be performed at a temperature of 0° C. or higher for 1 hour to 24 hours under reduced pressure. More preferable is 1 hour to 24 hours at a temperature of 0° C. to 200° C., further preferable is 1 hour to 24 hours at a temperature of 10° C. to 200° C., particularly preferable is 2 hours to 18 hours at a temperature of 10° C. to 160° C., and most preferable is 4 hours to 18 hours at a temperature of 15° C. to 160° C.

Examples of the organoaluminum compound of the component (C) include trialkylaluminum, dialkylaluminum chloride, alkylaluminum dichloride, dialkylaluminum hydride, alkyl(dialkoxy)aluminum, dialkyl(alkoxy)aluminum, alkyl (diaryloxy)aluminum, dialkyl(aryloxy)aluminum, etc.

Examples of the trialkylaluminum include trimethylaluminum, triethylaluminum, tri-n-propylaluminum, tri-n-butylaluminum, triisobutylaluminum, tri-n-hexylaluminum, tri-n-octylaluminum, etc., examples of the dialkylaluminum chloride include dimethylaluminum chloride, diethylaluminum chloride, di-n-propylaluminum chloride, di-n-butylaluminum chloride, diisobutylaluminum chloride, di-n-hexylaluminum chloride, etc., examples of the alkylaluminum dichloride include methylaluminum dichloride, ethylaluminum dichloride, n-propylaluminum dichloride, n-butylaluminum dichloride, isobutylaluminum dichloride, n-hexylaluminum dichloride, etc., examples of the dialkylaluminum hydride include dimethylaluminum hydride, diethylaluminum hydride, di-n-propylaluminum hydride, di-n-butylaluminum hydride, diisobutylaluminum hydride, di-n-hexylaluminum hydride, etc., examples of the alkyl(dialkoxy)aluminum include methyl(dimethoxy)aluminum, methyl(diethoxy)aluminum, methyl(di-tert-butoxy)aluminum, etc., examples of the dialkyl(alkoxy)aluminum include dimethyl(methoxy)aluminum, dimethyl(ethoxy)aluminum, methyl(tert-butoxy)aluminum, etc., examples of the alkyl(diaryloxy)aluminum include methyl(diphenoxy)aluminum, methylbis(2,6-diisopropylphenoxy)aluminum, methylbis(2,6-diphenylphenoxy)aluminum, etc., and examples of the dialkyl(aryloxy)aluminum include dimethyl(phenoxy)aluminum, dimethyl(2,6-diisopropylphenoxy)aluminum, dimethyl(2,6-diphenylphenoxy)aluminum, etc.

Only one kind of these organoaluminum compounds may be used, or two or more kinds may be used by combining them.

The organoaluminum compound is preferably trialkylaluminum, more preferably trimethylaluminum, triethylaluminum, tri-n-butylaluminum, triisobutylaluminum, tri-n-hexylaluminum, or tri-n-octylaluminum, further preferably triisobutylaluminum, or tri-n-octylaluminum.

In contact between the component (A1), the component (A2), the component (B) and the component (C), a molar ratio ((A1)/(A2)) of the component (A1) to the component (A2) is from 1 to 90, and an amount of contact between the component (B) and the component (C) is arbitrary.

In contact between the component (A1), the component (A2), the component (B) and the component (C), as a molar ratio ((A1)/(A2)) of the component (A1) to the component (A2), a lower limit value is preferably 5 or more, more preferably 10 or more, further preferably 20 or more, particularly preferably 25 or more, and an upper limit value is preferably 80 or less, more preferably 70 or less, further preferably 65 or less.

A total use amount of the component (A1) and the component (A2) is preferably 1 to 10000 μmol/g, more preferably 10 to 1000 μmol/g, further preferably 20 to 500 mmol/g, per gram of the component (B).

A use amount of the component (C) is preferably 0.1 to 1000, more preferably 0.5 to 500, further preferably 1 to 100, expressed by the molar number of the aluminum atom of the organoaluminum compound per mole of the total molar number of the component (A1) and the component (A2).

In addition, in preparation of a catalyst for polymerization, an electron donating compound (component (D)) may be contacted, in addition to the component (A1), the component (A2), the component (B) and the component (C). A use amount of the electron donating compound is preferably 0.01 to 100, more preferably 0.1 to 50, further preferably 0.25 to 5, expressed by the molar number of the electron donating compound per mole of the total molar number of the component (A1) and the component (A2).

Examples of the electron donating compound include triethylamine, and trinormaloctylamine.

It is preferable that contact between the component (A1), the component (A2), the component (B) and the component (C) and, if necessary, the component (D) be performed under the inert gas atmosphere. A contact temperature is usually −100 to 300° C., preferably −80 to 200° C. A contact time is usually 1 minute to 200 hours, preferably 30 minutes to 100 hours. Further, respective components are fed into a polymerization reaction tank separately, and contact thereof may be performed in a polymerization reactor.

The method for producing an ethylene-α-olefin copolymer of the present invention is to copolymerize ethylene with an α-olefin in the presence of the catalyst for producing an ethylene-α-olefin copolymer.

Examples of a polymerization method include a vapor polymerization method, a slurry polymerization method, and a bulk polymerization method. Preferable is a vapor polymerization method, and more preferable is a continuous vapor polymerization method. A vapor polymerization reaction apparatus to be used in the polymerization method is usually an apparatus having a fluidized bed-type reaction tank, preferably an apparatus having a fluidized bed-type reaction tank having an extension part. A stirring wing may be arranged in a reaction tank.

As a method of supplying a catalyst for polymerization, and each catalyst component to a polymerization reaction tank, usually, a method of supplying them in the state where there is no moisture, using an inert gas such as nitrogen, and argon, hydrogen, ethylene, etc., or a method of dissolving or diluting each component in a solvent, and supplying them in the solution or slurry state is used.

When ethylene and an α-olefin are vapor-polymerized, a polymerization temperature is usually lower than a temperature at which an ethylene-α-olefin copolymer produced by polymerization is melted, preferably 0 to 150° C., more preferably 30 to 100° C. An inert gas may be introduced, or hydrogen as a molecular weight regulating agent may be introduced into a polymerization reaction tank. Alternatively, an electron donating compound may be introduced.

The α-olefin to be used in polymerization is an α-olefin having 3 to 20 carbon atoms, and examples include propylene, 1-butene, 1-pentene, 1-hexene, 1-heptene, 1-octene, 1-nonene, 1-decene, 1-dodecene, 4-methyl-1-pentene, 4-methyl-1-hexene, etc. These may be used alone, or two or more kinds may be used together. Preferable is 1-butene, 1-hexene, 4-methyl-1-pentene, or 1-octene.

As the method for producing an olefin copolymer of the present invention, a method of polymerizing an olefin using, as a polymerization catalyst component or a polymerization catalyst, a prepolymerization solid component obtained by polymerizing a small amount of an olefin using the component (A1), the component (A2), the component (B), and the component (C) and, if necessary, the electron donating compound (hereinafter, referred to as prepolymerization) is preferable.

Examples of the olefin to be used in prepolymerization include ethylene, propylene, 1-butene, 1-pentene, 1-hexene, 1-octene, 4-methyl-1-pentene, cyclopentene, cyclohexene, etc. One kind of them may be used, or two or more kinds may be used by combining them. Preferably, only ethylene is used, or ethylene is used together with an α-olefin, further preferably, only ethylene is used, or ethylene is used together with at least one kind α-olefin selected from 1-butene, 1-hexene and 1-octene.

A content of a preliminarily polymerized polymer in a prepolymerization solid component is preferably 0.01 to 1,000 g, more preferably 0.05 to 500 g, further preferably 0.1 to 200 g per gram of the component (B).

The prepolymerization method may be a continuous polymerization method or a batch polymerization method, and is, for example, a batch slurry polymerization method, a continuous slurry polymerization method, or a continuous vapor polymerization method. As a method of feeding the component (A1), the component (A2), the component (B), and the component (C) and, if necessary, the electron donating compound into a polymerization reaction tank in which prepolymerization is performed, usually, a method of feeding them in the state where there is no moisture, using an inert gas such as nitrogen, and argon, hydrogen, ethylene, etc., or a method of dissolving or diluting each component in a solvent, and feeding them in the solution or slurry state is used.

When prepolymerization is performed by a slurry polymerization method, as a solvent, a hydrocarbon compound is usually used, and examples include propane, normalbutane, isobutane, normalpentane, isopentane, normalhexane, cyclohexane, heptane, etc. These are used alone, or two or more kinds are used by combining them. As the hydrocarbon compound, a hydrocarbon compound having a boiling point at an ordinary pressure of 100° C. or lower is preferable, a hydrocarbon compound having a boiling point at an ordinary pressure of 90° C. or lower is more preferable, and propane, normalbutane, isobutane, normalpentane, isopentane, normalhexane, and cyclohexane are further preferable.

When prepolymerization is performed by a slurry polymerization method, as a slurry concentration, an amount of the component (B) per liter of a solvent is usually 0.1 to 600 g, preferably 0.5 to 300 g. A prepolymerization temperature is usually −20 to 100° C., preferably 0 to 80° C. During prepolymerization, a polymerization temperature may be appropriately changed, and a temperature at which prepolymerization is initiated, is preferably 45° C. or lower, preferably 40° C. or lower. A partial pressure of olefins at a vapor part during prepolymerization is usually 0.001 to 2 MPa, preferably 0.01 to 1 MPa. A prepolymerization time is usually 2 minutes to 15 minutes.

As a method of supplying a preliminarily polymerized prepolymerization solid catalyst component to a polymerization reaction tank, usually, a method of supplying it in the state where there is no moisture, using an inert gas such as nitrogen, and argon, hydrogen, ethylene, etc., or a method of dissolving or diluting each component in a solvent, and supplying it in the solution or slurry state is used.

The ethylene-α-olefin copolymer of the present invention may contain the known additive as necessary. Examples of the additive include antioxidants, weather resistant agents, lubricants, anti-blocking agents, antistatic agents, antifog agents, no-drip agents, pigments, fillers, etc.

The ethylene-α-olefin copolymer of the present invention is formed by the known molding method, for example, an extruding method such as a blown film process and a flat die process, a hollow molding method, an injection molding method; a compression molding method. As the molding method, an extruding, and a hollow molding method are suitably used, an extruding is more suitably used, and a flat die process is particularly suitably used. As utility, the copolymer can be suitably used in various foaming utilities such as electron beam crosslinking foaming, peroxide crosslinking foaming, extrusion non-crosslinking foaming, beads foaming, injection foaming, supercritical foaming, etc.

The ethylene-α-olefin copolymer of the present invention is used by molding into a variety of forms. A form of an article is not particularly limited, but the article is used in films, sheets, or containers (trays, bottles, etc.). The article is also suitably used in utilities such as food packaging materials; medicament packaging materials; electron parts packaging materials to be used for packaging semiconductor products; surface protective materials.

The ethylene-α-olefin copolymer of the present invention can be also blended at a suitable amount into an ethylene-based polymer for the purpose of improving neck-in of the ethylene-based polymer inferior in neck-in. For example, by blending a suitable amount of the ethylene-α-olefin copolymer of the present invention into an ethylene-based polymer such as linear low density polyethylene, neck-in can be considerably improved.

The ethylene-α-olefin copolymer of the present invention can be also blended at a suitable amount in an ethylene-based polymer for the purpose of improving foaming property of the ethylene-based polymer inferior in foaming property. For example, by blending a suitable amount of the ethylene-α-olefin copolymer of the present invention into an ethylene-based polymer such as linear low density polyethylene, foaming property can be considerably improved.

EXAMPLES

The present invention will be explained below by way of Examples and Comparative Examples.

Physical properties in Examples and Comparative Examples were measured according to the following methods.

(1) Density (d, Unit: Kg/m$^3$)

Density was measured according to the method defined in the A method, among JIS K7112-1980. A sample was subjected to annealing described in JIS K6760-1995.

(2) Melt Flow Rate (MFR, Unit: g/10 min)

Melt flow rate was measured by the A method under the conditions of a load of 21.18 N and a temperature of 190° C., in the method defined in JIS K7210-1995.

(3) Melt Flow Rate Ratio (MFRR)

A melt flow rate (H-MFR) measured under the conditions of a test load of 211.82 N and a measurement temperature of 190° C., in the method defined in JIS K7210-1995, and a melt flow rate (MFR) measured under the conditions of a load of 21.18 N and a temperature of 190° C., in the method defined in JIS K7210-1995, were measured, and a value in which H-MFR was divided by MFR was obtained.

(4) Swell Ratio (SR)

A strand of an ethylene-α-olefin copolymer extruded at a length of around 15 to 20 mm from an orifice under the conditions of a temperature of 190° C. and a load of 21.18 N in measurement of the melt flow rate of (2) was cooled in air to obtain a solid strand. Then, a diameter D (unit: mm) of the strand at a position of about 5 mm from an extrusion upstream side tip of the strand was measured, a value (D/D$_0$) obtained by dividing the diameter D by an orifice diameter 2.095 mm (D$_0$) was calculated, and this was adopted as a swell ratio.

(5) Molecular Weight Distribution (Mw/Mn, Mz/Mw)

Using the gel permeation chromatograph (GPC) method, and under the following conditions (1) to (8), a z average molecular weight (Mz), a weight average molecular weight (Mw) and a number average molecular weight (Mn) were measured, and Mw/Mn and Mz/Mw were obtained. A baseline on a chromatograph was a straight line obtained by connecting a point at a stable horizontal region in which a retention time is sufficiently shorter than appearance of a sample elution peak, and a point at a stable horizontal region in which a retention time is sufficiently longer than observance of a solvent elution peak. A molecular weight at each peak position of a bimodal distribution is a value obtained in terms of polyethylene, by calibration.

(1) Apparatus: HLC-8121GPC/HT manufactured by TOSOH CORPORATION
(2) Separation column: Tosoh TSKgel $GMH_{HR}$-H(20)HT
(3) Measurement temperature: 152° C.
(4) Carrier: orthodichlorobenzene
(5) Flow rate: 0.1 ml/min
(6) Injection amount: 300 μl
(7) Detector: differential refraction
(8) Molecular weight standard substance: standard polystyrene (6) Number of branches having 5 or more carbon atoms ($N_{LCB}$, unit: 1/1000 C)

By a carbon nuclear magnetic resonance method, and under the following measurement conditions, a carbon nuclear magnetic resonance spectrum ($^{13}$C-NMR) was measured, and a number of branches was obtained by the following calculation method.

<Measurement Condition>
Apparatus: AVANCE600 manufactured by Bruker
Measurement solvent: mixed solution of 1,2-dichlorobenzene/1,2-dichlorobenzene-d4=75/25 (volumetric ratio)
Measurement temperature: 130° C.
Measurement method: proton decoupling method
Pulse width: 45 degree
Pulse repetition time: 4 seconds
Measurement standard: trimethylsilane
Window function: negative exponential function <Calculation Method>

When the sum of all peaks observed at 5 to 50 ppm was taken as 1000, a peak area of peaks having a peak top at around 38.22 to 38.27 ppm was obtained. The peak area of the peak was defined as an area of a signal in a range from a chemical shift of a valley between a peak adjacing on a higher magnetic field side to a chemical shift of a valley between a peak adjacing on a lower magnetic field side. In measurement of an ethylene-1-octene copolymer under the present condition, a position of a peak top of a peak derived from methine carbon to which a branch having 6 carbon atoms is attached, was 38.21 ppm.

(7) Melt Complex Viscosity ($\eta^*$, Unit: Pa·Sec)

Using a viscoelasticity measuring apparatus (Rheometrics Mechanical Spectrometer RMS-800 manufactured by Rheometrics), and under the following measurement conditions, a melt complex viscosity-angular frequency curve at 190° C. was measured, and a melt complex viscosity measured at an angular frequency of 100 rad/sec was obtained. As the melt complex viscosity is lower, an extrusion load at extruding is more superior.

<Measurement Conditions>
Geometry: parallel plates
Plate diameter: 25 mm
Plate interval: 1.5 to 2 mm
Strain: 5%
Angular frequency: 0.1 to 100 rad/sec
Measurement atmosphere: nitrogen (8) Measurement of Elongational Viscosity of Melted Resin Using an elongational viscosity measuring apparatus (ARES manufactured by TA Instrument), and at a Hencky rate of 0.1 s$^{-1}$ and 1 s$^{-1}$, an elongational viscosity-time curve of a melted resin at 130° C. was measured. As a measurement test piece, a sheet of 18 mm×10 mm, having a thickness of 0.7 mm, obtained by press molding was used.

(9) Melt Tension (MT, Unit: cN)

Using a melt tension tester manufactured by Toyo Seiki Seisakusho, Ltd., and at a temperature of 190° C. and an extrusion rate of 0.32 g/min, an ethylene-α-olefin copolymer was melt-extruded from an orifice having a diameter of 2.095 mm and a length of 8 mm, the extruded and melted ethylene-α-olefin copolymer was taken up filament-like by a take-up roll at a take-up increasing rate of 6.3 (m/min)/min, and a tensile force upon take-up was measured. A maximum tensile force during from take-up initiation to breakage of a filamentous ethylene-α-olefin copolymer was adopted as melt tension.

(10) Maximum Take-Up Velocity (MTV, Unit: m/Min)

A take-up velocity when a filamentous ethylene-α-olefin copolymer is broken in measurement of the melt tension of (9) was adopted as a maximum take-up velocity. As this value is higher, take-up property at extruding is more superior.

(11) Impact Strength (Unit: kJ/m$^2$)

Impact strength was measured according to ASTM D1822-68.

(12) Characteristic Relaxation Time ($\tau$)(Sec)

Using a viscoelasticity measuring apparatus (Rheometrics Mechanical Spectrometer RMS-800 manufactured by Rheometrics), and under the following measuring conditions, a melt complex viscosity-angular frequency curve at 130° C., 150° C., 170° C. and 190° C. was measured and, then, a master curve of a melt complex viscosity-angular frequency curve at 190° C. was produced from the resulting melt complex viscosity-angular frequency curve using calculation software Rhios V.4.4.4 manufactured by Rheometrics, and a characteristic relaxation time ($\tau$) was obtained.

<Measuring Condition>
Geometry: parallel plates
Plate diameter: 25 mm
Plate interval: 1.5 to 2 mm
Strain: 5%
Angular frequency: 0.1 to 100 rad/sec
Measurement atmosphere: nitrogen Example 1

(1) Preparation of Solid Catalyst Component

Into a nitrogen-replaced reactor equipped with a stirrer were fed 2.8 kg of silica (Sylopol948 manufactured by Debison) which had been heat-treated at 300° C. under nitrogen flowing and 24 kg of toluene, and the mixture was stirred. Thereafter, after cooled to 5° C., a mixed solution of 0.9 kg of 1,1,1,3,3,3-hexamethyldisilazane and 1.4 kg of toluene was added dropwise for 30 minutes while a temperature of the reactor was retained 5° C. After completion of addition, the mixture was stirred at 5° C. for 1 hour, then, the temperature was raised to 95° C., and the mixture was stirred at 95° C. for 3 hours, and filtered. The resulting solid product was washed with 20.8 kg of toluene six times. Thereafter, 7.1 kg of toluene was added to form a slurry, and the slurry was allowed to stand overnight.

(2) Polymerization

An autoclave equipped with a stirrer having an internal volume of 3 l, which had been replaced with argon after drying under reduced pressure, was evacuated, hydrogen was fed so that its partial pressure might become 0.05 MPa, 180 ml of 1-hexene, and 650 g of butane as a polymerization solvent were fed, and a temperature was raised to 70° C. Thereafter, ethylene was added so that its partial pressure became 1.6 MPa, and the system was stabilized. As a result of gas chromatography analysis, a gaseous composition in the system was hydrogen=3.1 mol %. Into this 0.9 ml of a hexane solution of isobutylaluminum as an organoaluminum compound (C), the concentration of which had been adjusted to 1 mol/l, was fed. Then, 3.125 ml of a toluene solution of methylsilanediylbis(cyclopentadienyl)zirconium dichloride [corresponding to transition metal compound (A1)], the concentration of which had been adjusted to 2 μmol/ml, and 0.5 ml of a toluene solution of diphenylmethylene(1-cyclopentadienyl)(9-fluorenyl)zirconium dichloride [corresponding to transition metal compound (A2)], the concentration of which had been adjusted to 1 μmol/ml, were fed and, subsequently, 73.6 mg of the solid catalyst composition obtained in the (1) was fed. During polymerization, while an ethylene/hydrogen mixed gas (hydrogen=0.33 mol %) was continuously supplied, polymerization was performed at 70° C. for 60 minutes. Thereafter, butane, ethylene and hydrogen were purged to obtain 82 g of an ethylene-1-hexene copolymer. After the resulting copolymer was kneaded with a roll (test roll Model HR-20F manufactured by Nisshin Chemical Industry, Co., Ltd.) so that all might become uniform, physical properties were assessed. The kneading conditions were a front roll temperature of 150° C., a back roll temperature of 160° C., a roll gap of 5 mm, and a kneading time of 5 minutes (after sample melting). Physical properties of the copolymer obtained by kneading are shown in Table 1.

Example 2

(1) Polymerization

An autoclave equipped with a stirrer having an internal volume of 3 l, which had been replaced with argon after drying under reduced pressure, was evacuated, hydrogen was fed so that its partial pressure might become 0.01 MPa, 180 ml of 1-hexene, and 650 g of butane as a polymerization solvent were fed, and a temperature was raised to 70° C. Thereafter, ethylene was fed so that its partial pressure might become 1.6 MPa, and the system was stabilized. As a result of gas chromatography analysis, a gaseous composition in the system was hydrogen=0.7 mol %. Into this 0.9 ml of a hexane solution of triisobutylaluminum as an organoaluminum compound (C), the concentration of which had been adjusted to 1 mol/l, was fed. Then, 3.125 ml of a toluene solution of dimethylsilanediylbis(cyclopentadienyl)zirconium dichloride [corresponding to transition metal compound (A1)], the concentration of which had been adjusted to 2 mmol/ml, and 0.5 ml of a toluene solution of diphenylmethylene(1-cyclopentadienyl)(9-fluorenyl)zirconium dichloride [corresponding to transition metal compound (A2)], the concentration of which had been adjusted to 1 μmol/ml, were fed and, subsequently, 52.3 mg of the solid catalyst component obtained in Example 1 (1) was fed. During polymerization, while an ethylene/hydrogen mixed gas (hydrogen=0.11 mol %) was continuously supplied, polymerization was performed at 70° C. for 60 minutes. Thereafter, butane, ethylene and hydrogen were purged to obtain 82 g of an ethylene-1-hexene copolymer. After the resulting copolymer was kneaded with a roll (test roll Model HR-20F manufactured by Nisshin Chemical Industry, Co., Ltd.) so that all might become uniform, physical properties were assessed. The kneading conditions were a front roll temperature of 150° C., a back roll temperature of 160° C., a roll gap of 5 mm, and a kneading time of 5 minutes (after sample melting). Physical properties of the copolymer obtained by kneading are shown in Table 1.

Example 3

(1) Polymerization

An autoclave equipped with a stirrer having an internal volume of 3 l, which had been replaced with argon after drying under reduced pressure, was evacuated, hydrogen was fed so that its partial-pressure might become 0.02 MPa, 180 ml of 1-hexene, and 650 g of butane as a polymerization solvent were fed, and a temperature was raised to 70° C. Thereafter, ethylene was fed so that its partial pressure might become 1.6 MPa, and the system was stabilized. As a result of gas chromatography analysis, a gaseous composition in the system was hydrogen=1.2 mol %. Into this 0.9 ml of a hexane solution of triisobutylaluminum as an organoaluminum compound (C), a concentration of which had been adjusted to 1 mol/l, was fed. Then, 3.125 ml of a toluene solution of dimethylsilanediylbis(cyclopentadienyl)zirconium dichloride [corresponding to transition metal compound (A1)], the concentration of which had been adjusted to 2 mmol/ml, and 0.5 ml of a toluene of solution of diphenylmethylene(1-cyclopentadienyl)(9-fluorenyl)zirconium dichloride [corresponding to transition metal compound (A2)], the concentration of which had been adjusted to 1 mmol/ml, were fed and, subsequently, 48.2 mg of the solid catalyst component obtained in Example 1 (1) was fed. During polymerization, while an ethylene/hydrogen mixed gas (hydrogen=0.11 mol %) was continuously supplied, polymerization was performed at 70° C. for 60 minutes. Thereafter, butane, ethylene and hydrogen were purged to obtain 82 g of an ethylene-1-hexene copolymer. After the resulting copolymer was kneaded with a roll (test roll Model HR-20F manufactured by Nisshin Chemical Industry, Co., Ltd.) so that all might become uniform, physical properties were assessed. The kneading conditions were a front roll temperature of 150° C., a back roll temperature of 160° C., a roll gap of 5 mm, and a kneading time of 5 minutes (after sample melting). Physical properties of the copolymer obtained by kneading are shown in Table 1.

Example 4

(1) Polymerization

An autoclave equipped with a stirrer having an internal volume of 3 l, which had been replaced with argon after drying under reduced pressure, was evacuated, hydrogen was fed so that its partial pressure might become 0.03 MPa, 180 ml of 1-hexene, and 650 g of butane as a polymerization solvent were fed, and a temperature was raised to 70° C. Thereafter, ethylene was fed so that its partial pressure might become 1.6 MPa, and the system was stabilized. As a result of gas chromatography analysis, a gaseous composition in the system was hydrogen=1.8 mol %. Into this 0.9 ml of a hexane solution of triisobutylaluminum as an organoaluminum compound (C), the concentration of which had been adjusted to 1 mol/l, was fed. Then, 3.125 ml of a toluene solution of dimethylsilanediylbis(cyclopentadienyl)zirconium dichloride [corresponding to transition metal compound (A1)], a concentration of which had been adjusted to 2 μmol/ml, and 0.5 ml of a toluene solution of diphenylmethylene(1-cyclopentadienyl)(9-fluorenyl)zirconium dichloride [corresponding to transition metal compound (A2)], the concentration of which had been adjusted to 1 μmol/ml, were fed and, subsequently, 53.3 mg of the solid catalyst composition obtained in Example 1 (1) was fed. During polymerization, while an ethylene/hydrogen mixed gas (hydrogen=0.19 mol %) was continuously supplied, polymerization was performed at 70° C. for 60 minutes. Thereafter, butane, ethylene and hydrogen were purged to obtain 58 g of an ethylene-1-hexene copolymer. After the resulting copolymer was kneaded with a roll (test roll Model HR-20F manufactured by Nisshin Chemical Industry, Co., Ltd.) so that all might become uniform, physical properties were assessed. The kneading conditions were a front roll temperature of 150° C., a back roll temperature of 160° C., a roll gap of 5 mm, and a kneading time of 5 minutes (after sample melting). Physical properties of the copolymer obtained by kneading are shown in Table 1.

Example 5

(1) Polymerization

An autoclave equipped with a stirrer having an internal volume of 3 l, which had been replaced with argon after drying under reduced pressure, was evacuated, 180 ml of 1-hexene, and 650 g of butane as a polymerization solvent were placed, and a temperature was raised to 70° C. Thereafter, ethylene was fed so that its partial pressure might become 1.6 MPa, and the system was stabilized. Into this 0.9 ml of a hexane solution of triisobutylaluminum as an organoaluminum compound (C), the concentration of which had been adjusted to 1 mol/l, was fed. Then, 3 ml of a toluene solution of dimethylsilanediylbis(cyclopentadienyl)zirconium dichloride [corresponding to transition metal compound (A1)], a concentration of which had been adjusted to 2 µmol/ml, and 0.1 ml of a toluene solution of diphenylmethylene(1-cyclopentadienyl)(9-fluorenyl)zirconium dichloride [corresponding to transition metal compound (A2)], the concentration of which had been adjusted to 1 µmol/ml, were fed, subsequently, 43.7 mg of the solid catalyst component obtained in Example 1 (1) was fed. During polymerization, while an ethylene/hydrogen mixed gas (hydrogen=0.07 mol %) was continuously supplied, polymerization was performed at 70° C. for 40 minutes. Thereafter, butane, ethylene and hydrogen were purged to obtain 53 g of an ethylene-1-hexene copolymer. After the resulting copolymer was kneaded with a roll (test roll Model HR-20F manufactured by Nisshin Chemical Industry, Co., Ltd.) so that all might become uniform, physical properties were assessed. The kneading conditions were a front roll temperature of 150° C., a back roll temperature of 160° C., a roll gap of 5 mm, and a kneading time of 5 minutes (after sample melting). Physical properties of the copolymer obtained by kneading are shown in Table 1.

Example 6

(1) Polymerization

An autoclave equipped with a stirrer having an internal volume of 3 l, which had been replaced with argon after drying under reduced pressure, was evacuated, hydrogen was added so that its partial pressure might become 0.01 MPa, 180 ml of 1-hexene, and 650 g of butane as a polymerization solvent were fed, and a temperature was raised to 70° C. Thereafter, ethylene was fed so that its partial pressure might become 1.6 MPa, and the system was stabilized. As a result of gas chromatography analysis, a gaseous composition in the system was hydrogen=0.54 mol %. Into this 0.9 ml of a hexane solution of triisobutylaluminum as an organoaluminum compound (C), the concentration of which had been adjusted to 1 mol/l, was fed. Then, 3 ml of a toluene solution of dimethylsilanediylbis(cyclopentadienyl)zirconium dichloride [corresponding to transition metal compound (A1)], the concentration of which had been adjusted to 2 µmol/ml, and 0.1 ml of a toluene solution of diphenylmethylene(1-cyclopentadienyl)(9-fluorenyl)zirconium dichloride [corresponding to transition metal compound (A2)], the concentration of which had been adjusted to 1 µmol/ml, were fed and, subsequently, 47.1 mg of the solid catalyst component obtained in Example 1 (1) was fed. During polymerization, while an ethylene/hydrogen mixed gas (hydrogen=0.11 mol %) was continuously supplied, polymerization was performed at 70° C. for 60 minutes. Thereafter, butane, ethylene and hydrogen were purged to obtain 82 g of an ethylene-1-hexene copolymer. After the resulting copolymer was kneaded with a roll (test roll Model HR-20F manufactured by Nisshin Chemical Industry, Co., Ltd.) so that all might become uniform, physical properties were assessed. The kneading conditions were a front roll temperature of 150° C., a back roll temperature of 160° C., a roll gap of 5 mm, and a kneading time was 5 minutes (after sample melting). Physical properties of the copolymer obtained by kneading are shown in Table 1.

Example 7

(1) Polymerization

An autoclave equipped with a stirrer having an internal volume of 3 l, which had been replaced with argon after drying under reduced pressure, was evacuated, hydrogen was fed so that its partial pressure might become 0.015 MPa, 180 ml of 1-hexene, and 650 g of butane as a polymerization solvent were fed, and a temperature was raised to 70° C. Thereafter, ethylene was fed so that its partial pressure might become 1.6 MPa, and the system was stabilized. As a result of gas chromatography analysis, a gaseous composition in the system was hydrogen=1.0 mol %. Into this 0.9 ml of a hexane solution of triisobutylaluminum as an organoaluminum compound (C), the concentration of which had been adjusted to 1 mol/l, was fes. Then, 3 ml of a toluene solution of dimethylsilanediylbis(cyclopentadienyl)zirconium dichloride [corresponding to transition metal compound (A1)], a concentration of which had been adjusted to 2 µmol/ml, and 0.1 ml of a toluene solution of diphenylmethylene(1-cyclopentadienyl)(9-fluorenyl)zirconium dichloride [corresponding to transition metal compound (A2)], the concentration of which had been adjusted to 1 µmol/ml, were fed and, subsequently, 48.3 mg of the solid catalyst component obtained in Example 1 (1) was fed. During polymerization, while an ethylene/hydrogen mixed gas (hydrogen=0.19 mol %) was continuously supplied, polymerization was performed at 70° C. for 60 minutes. Thereafter, butane, ethylene, and hydrogen were purged to obtain 69 g of an ethylene-1-hexene copolymer. After the resulting copolymer was kneaded with a roll (test roll Model HR-20F manufactured by Nisshin Chemical Industry, Co., Ltd.) so that all might become uniform, physical properties were assessed. The kneading conditions were a front roll temperature of 150° C., a back roll temperature of 160° C., a roll gap of 5 mm, and kneading time of 5 minutes (after sample melting). Physical properties of the copolymer obtained by kneading are shown in Table 1.

Comparative Example 1

(1) Preparation of Solid Catalyst Component (S)

Into a nitrogen-replaced reactor equipped with a stirrer was placed 9.68 kg of silica (Sylopol948 manufactured by Debison) which had been heat-treated at 300° C. under nitrogen flowing, as a component (b4) granular carrier. After 100 l of toluene was added, the mixture was cooled to 2° C. To this 26.3 l of a toluene solution (2.9M) of methylalmoxane was added dropwise over 1 hour. After stirring at 5° C. for 30 minutes, the mixture was heated to 95° C. over 90 minutes, and stirred for 4 hours. Thereafter, after cooled to 40° C., this was allowed to stand for 40 minutes to precipitate a solid component, and a slurry part of the upper layer was removed. As washing operation, to this 100 l of toluene was added, the mixture was stirred for 10 minutes, thereafter, stirring was stopped, this was allowed to stand to precipitate a solid component, and a slurry part of the upper layer was similarly removed. The above washing operation was repeated totally three times. Further, 100 l of toluene was added, stirring was performed and, thereafter, filtration was performed simultaneously with stopping of stirring. After this operation was repeated once more, 110 l of hexane was added, and filtration was performed by the same method. This operation was repeated once more. Thereafter, by performing drying at 70° C. for 7 hours under nitrogen flowing, 12.6 kg of a solid catalyst component was obtained. As a result of elementary analysis, Al was 4.4 mmol/g.

(2) Preparation of Slurry-Like Catalyst Component (Cat-1)

Into 100 ml of a nitrogen-replaced flask made of a glass were fed 12.5 ml of a toluene solution of dimethylsilanediyl-bis(cyclopentadienyl)zirconium dichloride [corresponding to transition metal compound (A1)], the concentration of which had been adjusted to 2 μmol/ml, and 1 ml of a toluene solution of diphenylmethylene(1-cyclopentadienyl)(9-fluorenyl)zirconium dichloride [corresponding to transition metal compound (A2)], the concentration of which had been adjusted to 2 μmol/ml, thereafter, 200 mg of the solid catalyst component (S) prepared in the (1) was added to perform a reaction at room temperature for 5 minutes. Thereafter, after the supernatant was removed by decantation, this was washed with hexane two times to obtain 6 ml of a hexane slurry.

(3) Polymerization

An autoclave equipped with a stirrer having an internal volume of 3 l, which had been replaced with argon after drying under reduced pressure, was evacuated, 180 ml of 1-hexene, and 650 g of butane as a polymerization solvent were fed, and a temperature was raised to 70° C. Thereafter, an ethylene/hydrogen mixed gas (hydrogen=0.33 mol %) was added so that a partial pressure of the mixed gas might become 1.6 MPa, and the system was stabilized. As a result of gas chromatography analysis, a gaseous composition in the system was hydrogen=0.15 mol %. Into this 0.9 ml of a hexane solution of triisobutylaluminum as an organoaluminum compound (C), a concentration of which had been adjusted to 1 mol/l, was fed. Then, 6 ml of the slurry-like catalyst component (Cat-1) prepared in the (2) was fed. During polymerization, while an ethylene/hydrogen mixed gas (hydrogen=0.33 mol %) was continuously supplied, polymerization was performed at 70° C. for 60 minutes. Thereafter, butane, ethylene and hydrogen were purged to obtain 71 g of an ethylene-1-hexene copolymer. After the resulting copolymer was kneaded with a roll (test roll Model HR-20F manufactured by Nisshin Chemical Industry, Co., Ltd.) so that all might become uniform, physical properties were assessed. The kneading conditions were a front roll temperature of 150° C., a back roll temperature of 160° C., a roll gap of 5 mm, and a kneading time of 5 minutes (after sample melting). Physical properties of the copolymer obtained by kneading are shown in Table 2.

Comparative Example 2

(1) Polymerization

An autoclave equipped with a stirrer having an internal volume of 3 L, which had been replaced with argon after drying under reduced pressure, was evacuated, 180 ml of 1-hexene, and 650 g of butane as a polymerization solvent were fed, and a temperature was raised to 70° C. Thereafter, ethylene was added so that its partial pressure might become 1.6 MPa, and the system was stabilized. Into this 0.9 ml of a hexane solution of triisobutylaluminum as an organoaluminum compound (C), a concentration of which had been adjusted to 1 mol/l, was fed. Then, 6 ml of the slurry-like catalyst component (Cat-1) prepared under the same condition as that of Comparative Example 1 (2) was fed. During polymerization, while an ethylene/hydrogen mixed gas (hydrogen=0.23 mol %) was continuously supplied, polymerization was performed at 70° C. for 60 minutes. Thereafter, butane, ethylene and hydrogen were purged to obtain 123 g of an ethylene-1-hexene copolymer. After the resulting copolymer was kneaded with a roll (test roll Model HR-20F manufactured by Nisshin Chemical Industry, Co., Ltd.), physical properties were assessed. The kneading conditions were a front roll temperature of 150° C., a back roll temperature of 160° C., a roll gap of 5 mm, and a kneading time of 5 minutes (after sample melting). Physical properties of the copolymer obtained by kneading are shown in Table 2.

Comparative Example 3

(1) Preparation of Solid Catalyst Component

Into a nitrogen-replaced reactor equipped with a stirrer were fed 2.8 kg of silica (Sylopol948 manufactured by Debison; 50% volume average particle diameter=55 μm; pore volume=1.67 ml/g; specific surface area-325 $m^2$/g) which had been heat-treated at 300° C. under nitrogen flowing, and 24 kg of toluene, and the mixture was stirred. Thereafter, after cooled to 5° C., a mixed solution of 0.9 kg of 1,1,1,3,3,3-hexamethyldisilazane and 1.4 kg of toluene was added dropwise for 30 minutes while the temperature of the reactor was retained at 5° C. After completion of addition, the mixture was stirred at 5° C. for 1 hour, then, the temperature was raised to 95° C., and this was stirred at 95° C. for 3 hours, and filtered. The resulting solid product was washed with 20.8 kg of toluene six times. Thereafter, 7.1 kg of toluene was added to form a slurry, and the slurry was allowed to stand overnight.

(2) Polymerization

Autoclave equipped with a stirrer having an internal volume of 3 l, which had been replaced with argon after drying under reduced pressure, was evacuated, hydrogen was added so that its partial pressure might become 0.025 MPa, 180 ml of 1-hexene, and 650 g of butane as a polymerization solvent were fed, and a temperature was raised to 70° C. Thereafter, ethylene was added so that its partial pressure might become 1.6 MPa, and the system was stabilized. As a result of gas chromatography analysis, a gaseous composition in a system was hydrogen=1.6 mol %. Into this 0.9 ml of a hexane solution of triisobutylaluminum as an organoaluminum compound (C), a concentration of which had been adjusted to 1 mol/l, was fed. Then, 0.2 ml of a toluene solution of ethylenebis(indenyl)zirconium diphenoxide, the concentration of which had been adjusted to 2 mmol/ml, and 0.3 ml of a toluene solution of diphenylmethylene(cyclopentadienyl)(9-fluorenyl)zirconium dichloride [corresponding to transition metal compound (A2)], the concentration of which had been adjusted to 0.1 μmol/ml were placed and, subsequently, 18.8 mg of the solid catalyst component obtained in the (1) was fed. During polymerization, while an ethylene/hydrogen mixed gas (hydrogen=0.22 mol %) was continuously supplied, polymerization was performed at 70° C. for 60 minutes. Thereafter, butane, ethylene and hydrogen were purged to obtain 179 g of an ethylene-1-hexene copolymer. After the resulting copolymer was kneaded with a roll (test roll Model HR-20F manufactured by Nisshin Chemical Industry, Co., Ltd.) that all might become uniform, physical properties were assessed. The kneading conditions were a front roll temperature of 150° C., a back roll temperature of 160° C., a roll gap of 5 mm, and a kneading time of 5 minutes (after sample melting). Physical properties of the copolymer obtained by kneading are shown in Table 2.

TABLE 2

|  |  | Comparative Example 1 | Comparative Example 2 | Comparative Example 3 |
|---|---|---|---|---|
| Density | kg/m$^3$ | 920 | 913 | 919 |
| MFR | g/10 min | 2.96 | 0.17 | 1.82 |
| SR | — | 2.48 | 1.59 | 1.97 |
| Molecular weight distribution | — |  |  |  |
| Mw/Mn |  | 11.0 | 12.4 | 6.8 |
| Mz/Mw |  | 6.9 | 6.4 | 3.1 |
| GPC peak number | Number | 2 | 2 | 1 |
| Molecular weight at peak position on high molecular weight side | 10$^3$ | 170.6 | 136.0 | — |
| Molecular weight at | 10$^3$ | 15.8 | 14.7 | — |

TABLE 1

|  |  | Example 1 | Example 2 | Example 3 | Example 4 | Example 5 | Example 6 | Example 7 |
|---|---|---|---|---|---|---|---|---|
| Density | kg/m$^3$ | 929 | 927 | 926 | 928 | 927 | 929 | 931 |
| MFR | g/10 min | 12.90 | 0.25 | 0.66 | 4.18 | 1.39 | 4.32 | 10.90 |
| SR | — | 2.15 | 1.45 | 1.66 | 2.09 | 2.23 | 2.36 | 2.59 |
| Molecular weight distribution | — |  |  |  |  |  |  |  |
| Mw/Mn |  | 13.4 | 14.4 | 13.3 | 11.0 | 16.2 | 11.4 | 11.0 |
| Mz/Mw |  | 6.4 | 7.0 | 6.7 | 7.7 | 6.3 | 8.7 | 10.2 |
| GPC peak number | Number | 2 | 2 | 2 | 2 | 2 | 2 | 2 |
| Molecular weight at peak position on high molecular weight side | 10$^3$ | 169.1 | 328.6 | 274.3 | 224.1 | 666.3 | 422.1 | 368.1 |
| Molecular weight at peak position on low molecular weight side | 10$^3$ | 9.5 | 14.6 | 13.1 | 11.4 | 17.4 | 16.3 | 13.4 |
| H/L |  | 0.29 | 0.33 | 0.34 | 0.25 | 0.28 | 0.20 | 0.16 |
| DSC melt peak number | Number | 1 | 1 | 1 | 1 | 1 | 1 | 1 |
| $N_{LCB}$ | 1/1000 C | 0.07 | 0.20 | 0.10 | 0.14 | 0.24 | 0.26 | 0.17 |
| Melt complex viscosity | Pa · sec | 170 | 349 | 346 | 208 | 185 | 142 | 103 |
| k | — | 0.82 | 0.63 | 1.0 | 1.10 | 1.15 | 1.23 | 1.17 |
| k1/k2 | — | 1.16 | 0.68 | 0.80 | 0.96 | 0.92 | 0.97 | 1.12 |
| Melt tensile force | cN | 2.1 | 23.5 | 15.9 | 8.7 | 36.0 | 15.8 | 9 |
| Maximum take-up velocity | m/min | 22.3 | 3.3 | 8.7 | 10.0 | 2.3 | 8.5 | 15.8 |
| Impact strength | kJ/m$^2$ | 181 | 358 | 432 | 173 | 134 | 107 | 82 |
| Relaxation time τ | s | 4 | 66 | 43 | 15 | 94 | 56 | 20 |

TABLE 2-continued

| | | Comparative Example 1 | Comparative Example 2 | Comparative Example 3 |
|---|---|---|---|---|
| peak position on low molecular weight side H/L | | 0.29 | 0.56 | — |
| DSC melt peak number | Number | 2 | 2 | 1 |
| $N_{LCB}$ | 1/1000 C. | 0 | 0.07 | 0.08 |
| Melt complex viscosity | Pa·sec | 244 | 796 | 554 |
| k | — | 1.04 | —* | —* |
| k1/k2 | — | 0.70 | —* | —* |
| Melt tensile force | cN | 15.4 | 28.6 | 8.7 |
| Maximum take-up velocity | m/min | 1.5 | 0.9 | 9.2 |
| Impact strength | kJ/m$^2$ | 447 | 1152 | 752 |
| Relaxation time τ | s | 16 | 21 | 4 |

*When measured at a Henckey rate of 1 s$^{-1}$, an elongated resin was broken before 2.5 seconds from elongation initiation.

INDUSTRIAL APPLICABILITY

According to the present invention, there can be provided an ethylene-α-olefin copolymer which has a low extrusion load, and is superior in take-up property when a melted copolymer is taken up under the constant tensile force condition, and an article obtained by extruding the copolymer. In addition, by copolymerizing ethylene with an α-olefin using the catalyst of the present invention, there can be produced an ethylene-α-olefin copolymer which has a low extrusion load, and is superior in take-up property when a melted copolymer is taken up under the constant tensile force.

The invention claimed is:

1. An ethylene-α-olefin copolymer comprising monomer units derived from ethylene and monomer units derived from an α-olefin having 3 to 20 carbon atoms, having a density (d) of 860 to 950 kg/m$^3$, having a melt flow rate (MFR) of 0.01 to 100 g/10 min, and having a bimodal molecular weight distribution, wherein the elongational viscosity nonlinear index ratio (k1/k2) thereof and the MFR satisfy the following relation:

$$0.084 \times \ln(MFR) + 0.69 < k1/k2 < 0.126 \times \ln(MFR) + 1.03,$$

wherein k1 is a value calculated as a slope of ln α(t) during t=2.0 seconds to 2.5 seconds and k2 is a value calculated as a slope of ln α(t) during t=1.5 seconds to 2.0 seconds, for a curve α(t):

$$\alpha(t) = \sigma_1(t)/\sigma_{0.1}(t)$$

wherein the curve α(t) is obtained by dividing a viscosity-time curve $\sigma_1(t)$ of a melted resin when monoaxially elongated at a temperature of 130° C. and a strain rate of 1 s$^{-1}$ at Hencky strain by a viscosity-time curve $\sigma_{0.1}(t)$ of a melted resin when monoaxially elongated at a temperature of 130° C. and a strain rate of 0.1 s$^{-1}$ at Hencky strain.

2. An ethylene-α-olefin copolymer comprising monomer units derived from ethylene and monomer units derived from an α-olefin having 3 to 20 carbon atoms, having a density (d) of 860 to 950 kg/m$^3$, having a melt flow rate (MFR) of 0.01 to 100 g/10 min, having a bimodal molecular weight distribution, and having a single melting peak measured by a differential scanning calorimeter (DSC) wherein the elongational viscosity nonlinear index ratio (k1/k2) thereof and the MFR satisfy the following relation:

$$0.084 \times \ln(MFR) + 0.69 < k1/k2 < 0.126 \times \ln(MFR) + 1.03,$$

wherein k1 is a value calculated as a slope of ln α(t) during t=2.0 seconds to 2.5 seconds and k2 is a value calculated as a slope of ln α(t) during t=1.5 seconds to 2.0 seconds, for a curve α(t):

$$\alpha(t) = \sigma_1(t)/\sigma_{0.1}(t)$$

wherein the curve α(t) is obtained by dividing a viscosity-time curve $\sigma_1(t)$ of a melted resin when monoaxially elongated at a temperature of 130° C. and a strain rate of 1 s$^{-1}$ at Hencky strain by a viscosity-time curve $\sigma_{0.1}(t)$ of a melted resin when monoaxially elongated at a temperature of 130° C. and a strain rate of 0.1 s$^{-1}$ at Hencky strain.

3. An article produced by extruding an ethylene-α-olefin copolymer comprising monomer units derived from ethylene and monomer units derived from an α-olefin having 3 to 20 carbon atoms, having a density (d) of 860 to 950 kg/m$^3$, having a melt flow rate (MFR) of 0.01 to 100 g/10 min, having a bimodal molecular weight distribution, and having a single melting peak measured by a differential scanning calorimeter (DSC).

* * * * *